United States Patent
Premaradj

(10) Patent No.: US 11,620,393 B1
(45) Date of Patent: Apr. 4, 2023

(54) SYSTEM AND METHOD FOR FACILITATING DISTRIBUTED PEER TO PEER STORAGE OF DATA

(71) Applicant: Aswath Premaradj, Pondicherry (IN)

(72) Inventor: Aswath Premaradj, Pondicherry (IN)

(73) Assignee: Aswath Premaradj

( * ) Notice: Subject to any disclaimer, the term of this patent is extended or adjusted under 35 U.S.C. 154(b) by 0 days.

(21) Appl. No.: 17/810,666

(22) Filed: Jul. 5, 2022

(30) Foreign Application Priority Data

May 14, 2022 (IN) .............................. 202241027846

(51) Int. Cl.
*G06F 21/60* (2013.01)
*G06F 21/62* (2013.01)
*H04L 67/104* (2022.01)

(52) U.S. Cl.
CPC ........ *G06F 21/602* (2013.01); *G06F 21/6218* (2013.01); *H04L 67/104* (2013.01)

(58) Field of Classification Search
CPC ... G06F 21/602; G06F 21/6218; H04L 67/104
See application file for complete search history.

(56) References Cited

U.S. PATENT DOCUMENTS

| | | | | |
|---|---|---|---|---|
| 11,050,564 B1 * | 6/2021 | Guo | .................... | G06F 21/6209 |
| 2002/0094089 A1 * | 7/2002 | Kamiya | .................. | H04L 9/085 |
| | | | | 380/279 |
| 2004/0039829 A1 * | 2/2004 | Bucher | .............. | H04L 67/1095 |
| | | | | 709/229 |
| 2010/0023722 A1 | 1/2010 | Tabbara et al. | | |
| 2010/0088269 A1 * | 4/2010 | Buller | .................... | H04L 67/108 |
| | | | | 713/193 |
| 2013/0305039 A1 * | 11/2013 | Gauda | ................. | G06F 21/6272 |
| | | | | 713/153 |
| 2015/0154418 A1 * | 6/2015 | Redberg | ................ | H04L 9/0631 |
| | | | | 713/165 |

(Continued)

FOREIGN PATENT DOCUMENTS

WO WO-2022208535 A1 * 10/2022

OTHER PUBLICATIONS

SDSF: social-networking trust based distributed data storage and co-operative information fusion; Phanl Chakravarthy Polina; (2014). Electronic Theses and Dissertations. Paper 1758; https://doi.org/10/18297/etd/1758.

(Continued)

*Primary Examiner* — Meng Li
(74) *Attorney, Agent, or Firm* — Jason C. Cameron

(57) ABSTRACT

A system and method for facilitating distributed peer to peer storage of data is disclosed. The method includes receiving a request from a user to securely store one or more files, encrypting the one or more files by using one or more primary encryption keys and splitting each of the encrypted one or more files into an encrypted set of data chunks. The method further includes transmitting the encrypted set of data chunks to one or more trustee devices, encrypting a metadata by using a secondary encryption key and receiving a request to securely access the one or more files. Further, the method includes obtaining the encrypted set of data chunks and the secondary encryption key from the one or more trustee devices and creating the one or more files, such that the user is provided access of the one or more files.

20 Claims, 13 Drawing Sheets

(56) References Cited

U.S. PATENT DOCUMENTS

| | | | | |
|---|---|---|---|---|
| 2015/0310219 A1* | 10/2015 | Haager | ............ | H04L 9/0894 |
| | | | | 713/165 |
| 2017/0147220 A1* | 5/2017 | Cilfone | ............ | G06F 11/1076 |
| 2018/0053009 A1* | 2/2018 | Claes | ............ | H04L 9/0894 |
| 2019/0068615 A1* | 2/2019 | Pack | ............ | H04L 9/30 |
| 2020/0106600 A1* | 4/2020 | Dreifus | ............ | G06V 40/1359 |
| 2020/0372163 A1* | 11/2020 | Chung | ............ | G06F 16/1824 |
| 2021/0232509 A1* | 7/2021 | Pan | ............ | H04L 9/14 |
| 2021/0281406 A1* | 9/2021 | Huck | ............ | H04L 9/065 |
| 2022/0271933 A1* | 8/2022 | Chen | ............ | H04L 9/085 |
| 2022/0284110 A1* | 9/2022 | Hetzler | ............ | G06F 11/1453 |
| 2022/0286451 A1* | 9/2022 | Tokuyama | ............ | G06F 21/602 |
| 2022/0374537 A1* | 11/2022 | Lindemann | ............ | H04L 9/3239 |

OTHER PUBLICATIONS

Friendstore: cooperative online backup using trusted nodes; Dinh Nguyen Tran, Frank Chiang and Jinyang Li; https://dl.acm.org/doi/10.1145/1435497.1435504.

* cited by examiner

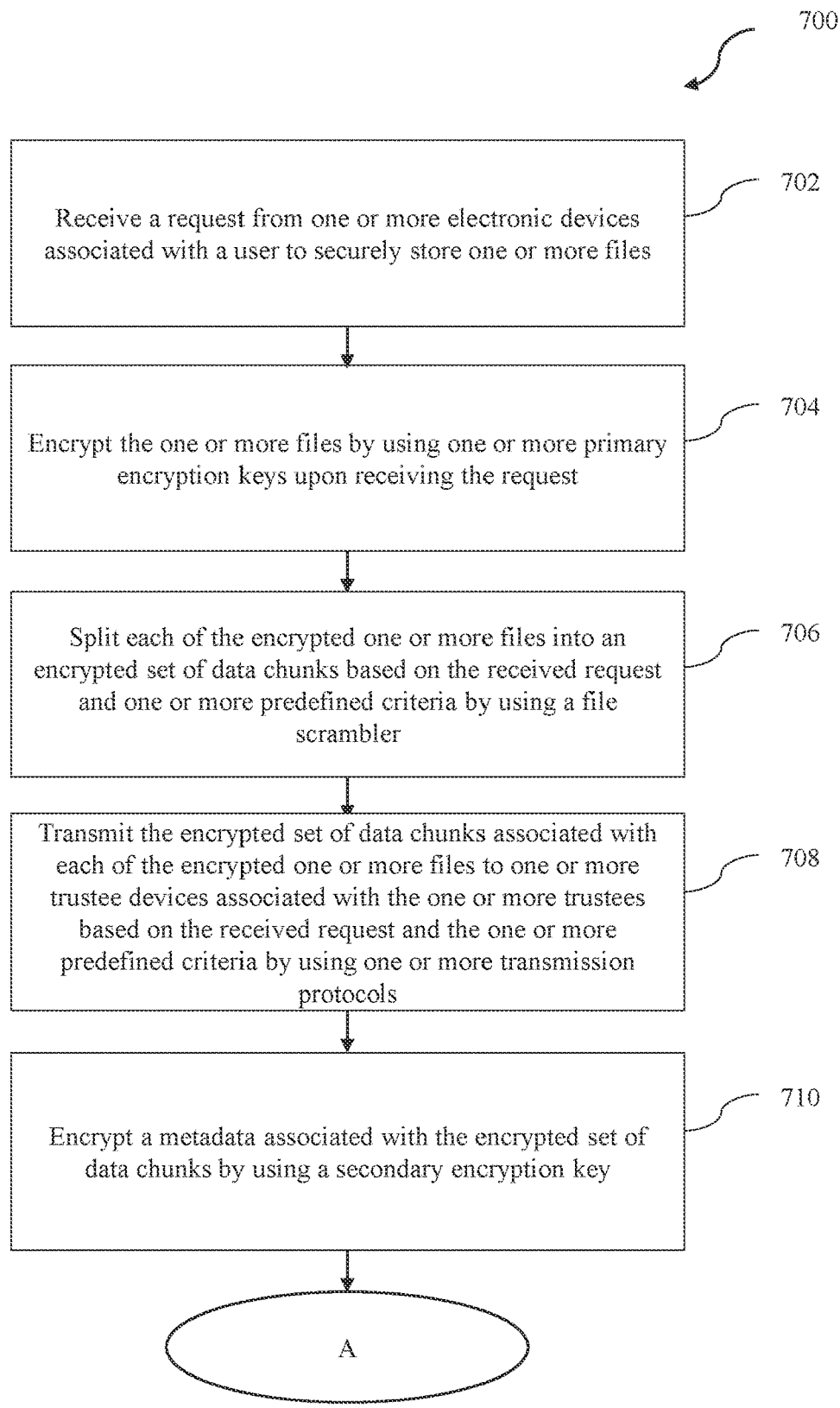
FIG. 7 (contd)

SYSTEM AND METHOD FOR FACILITATING DISTRIBUTED PEER TO PEER STORAGE OF DATA

This Application claims priority from a provisional patent application filed in India having Patent Application No. 202241027846, filed on May 14, 2022, and titled "SYSTEM AND METHOD FOR FACILITATING DISTRIBUTED PEER TO PEER STORAGE OF DATA".

FIELD OF INVENTION

Embodiments of the present disclosure relate to data storage systems and more particularly relate to a system and method for facilitating distributed peer to peer storage of data.

BACKGROUND

With the advancements in technology, most users are using a variety of online file backup platforms, such as cloud storage drives. The cloud storage drives provide a convenient and efficient method of storing data on a central server which may be on the internet or a decentralised server network. While using the cloud storage drives, the users store their data at a remote location, which may be accessed using the internet. The online file backup platforms are believed to be reliable and secure data from third party malicious agents. However, when a user forgets his or her credentials for accessing the data stored in the online file backup platforms, one or more security mechanisms which are used to prove the user's identity are cumbersome and lack intelligence. Further, there is always a risk of the credentials being hacked or leaked. If the credentials are hacked or leaked by a perpetrator, the user's data may be easily accessed, stolen or misused. Since the user's data is stored with a central authority like the service provider, there is a likelihood that the central authority may peek into the data being entrusted with it. Thus, there is an issue of data-privacy involved with the online file backup platforms. Furthermore, the online file backup platforms involve an issue of chain of custody of the data as to who may inherit the data when a primary data holder is unable to access it or hand it over to another person.

Hence, there is a need for an improved system and method for facilitating distributed peer to peer storage of data, in order to address the aforementioned issues.

SUMMARY

This summary is provided to introduce a selection of concepts, in a simple manner, which is further described in the detailed description of the disclosure. This summary is neither intended to identify key or essential inventive concepts of the subject matter nor to determine the scope of the disclosure.

In accordance with an embodiment of the present disclosure, a computing system for facilitating distributed peer to peer storage of data. The computing system includes one or more hardware processors and a memory coupled to the one or more hardware processors. The memory includes a plurality of modules in the form of programmable instructions executable by the one or more hardware processors. The plurality of modules include a data receiver module configured to receive a request from one or more electronic devices associated with a user to securely store one or more files. The request includes one or more trustees, number of the one or more trustees, a nominee, the one or more files, number of the one or more files and type of the one or more files. The one or more trustees correspond to a list of users who act as trusted contacts of the user. The plurality of modules also include a file encryption module configured to encrypt the one or more files by using one or more primary encryption keys upon receiving the request. Each of the one or more files are encrypted by using a different primary encryption key. The plurality of modules includes a data splitting module configured to split each of the encrypted one or more files into an encrypted set of data chunks based on the received request and one or more predefined criteria by using a file scrambler. The encrypted set of data chunks are in scrambled form. Further, the plurality of modules include a data transmission module configured to transmit the encrypted set of data chunks associated with each of the encrypted one or more files to one or more trustee devices associated with the one or more trustees based on the received request and the one or more predefined criteria by using one or more transmission protocols. The plurality of modules also include a metadata encryption module configured to encrypt a metadata associated with the encrypted set of data chunks by using a secondary encryption key. The secondary encryption key is synced with the one or more trustee devices via the one or more transmission protocols. The encrypted metadata is stored in the one or more electronic devices and a storage server. Furthermore, the plurality of modules include a request receiver module configured to receive a request from the one or more electronic devices to securely access the one or more files. The plurality of modules include a data obtaining module configured to obtain the encrypted set of data chunks and the secondary encryption key from the one or more trustee devices based on the received request and the encrypted metadata by using the one or more transmission protocols. The plurality of modules include a file creation module configured to create the one or more files based on the encrypted set of data chunks, the obtained secondary encryption key, and the encrypted metadata by using the file scrambler. Further the plurality of modules include an access providing module configured to provide access of the created one or more files to the user.

In accordance with another embodiment of the present disclosure, a method for facilitating distributed peer to peer storage of data is disclosed. The method includes receiving a request from one or more electronic devices associated with a user to securely store one or more files. The request includes one or more trustees, number of the one or more trustees, a nominee, the one or more files, number of the one or more files and type of the one or more files. The one or more trustees correspond to a list of users who act as trusted contacts of the user. The method also includes encrypting the one or more files by using one or more primary encryption keys upon receiving the request. Each of the one or more files are encrypted by using a different primary encryption key. The method further includes splitting each of the encrypted one or more files into an encrypted set of data chunks based on the received request and one or more predefined criteria by using a file scrambler. The encrypted set of data chunks are in scrambled form. Further, the method includes transmitting the encrypted set of data chunks associated with each of the encrypted one or more files to one or more trustee devices associated with the one or more trustees based on the received request and the one or more predefined criteria by using one or more transmission protocols. Also, the method includes encrypting a metadata associated with the encrypted set of data chunks by using a secondary encryption key. The secondary encryption key is synced with the one or more trustee devices via the one or more transmission protocols. The encrypted metadata is stored in the one or more electronic devices and a storage server. Further, the method includes receiving a request from the one or more electronic devices to securely access the one or more files. The method includes obtaining the encrypted set of data chunks and the secondary encryption key from the one or more trustee devices based on the received request and the encrypted metadata by using the one or more transmission protocols. The method includes creating the one or more files based on the encrypted set of data chunks, the obtained secondary encryption key, and the encrypted metadata by using the file scrambler. Furthermore, the method includes providing access of the created one or more files to the user.

Embodiment of the present disclosure also provide a non-transitory computer-readable storage medium having instructions stored therein that, when executed by a hardware processor, cause the processor to perform method steps as described above.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF DRAWINGS

The disclosure will be described and explained with additional specificity and detail with the accompanying figures in which.

Figure 1A:
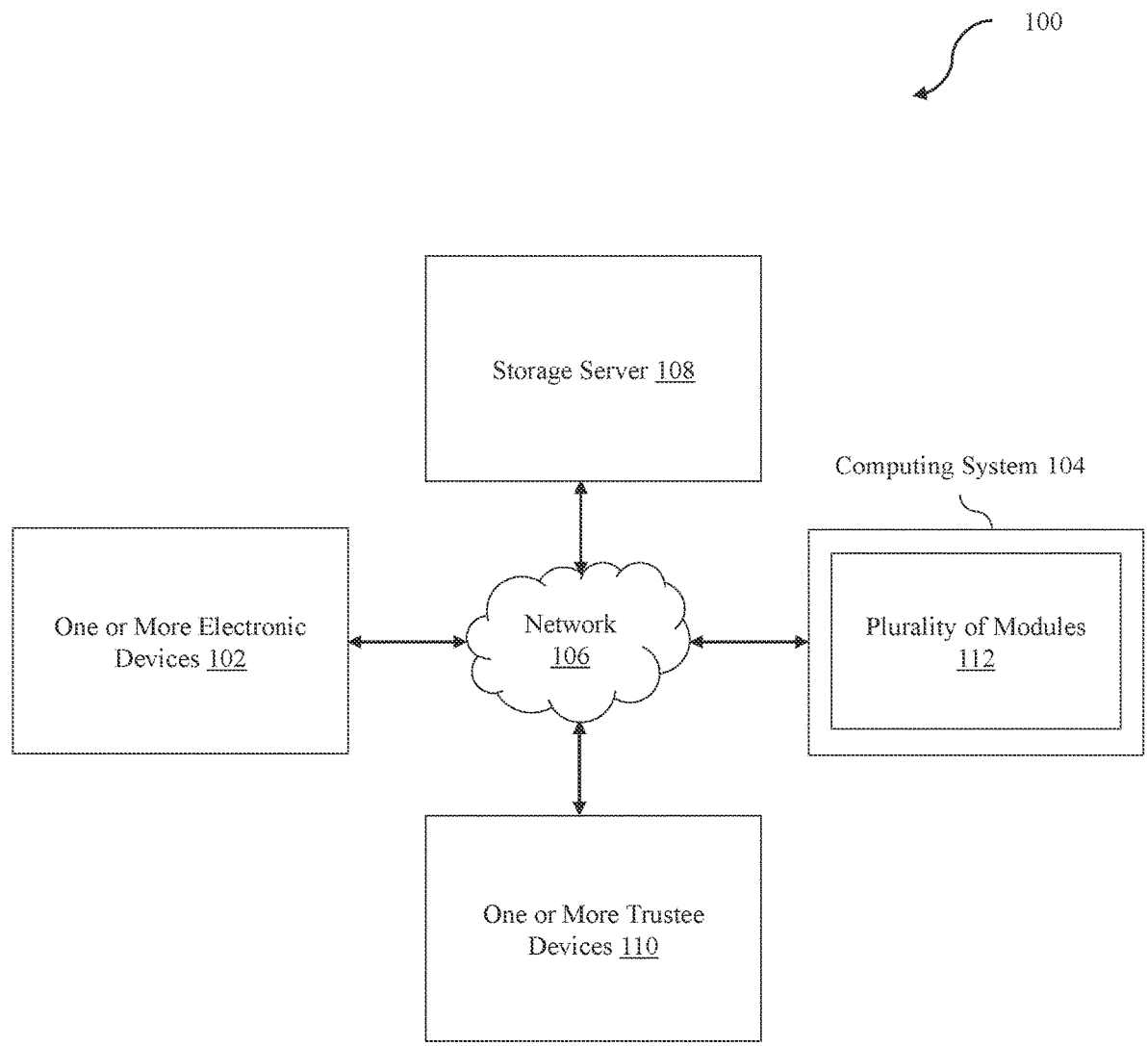
FIG. 1A is a block diagram illustrating an exemplary computing environment for facilitating distributed peer to peer storage of data, in accordance with an embodiment of the present disclosure.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION OF THE DISCLOSURE

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure. It will be understood by those skilled in the art that the foregoing general description and the following detailed description are exemplary and explanatory of the disclosure and are not intended to be restrictive thereof.

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

The terms "comprise". "comprising", or any other variations thereof, are intended to cover a non-exclusive inclusion, such that one or more devices or sub-systems or elements or structures or components preceded by "comprises . . . a" does not, without more constraints, preclude the existence of other devices, sub-systems, additional sub-modules. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

A computer system (standalone, client or server computer system) configured by an application may constitute a "module" (or "subsystem") that is configured and operated to perform certain operations. In one embodiment, the "module" or "subsystem" may be implemented mechanically or electronically, so a module include dedicated circuitry or logic that is permanently configured (within a special-purpose processor) to perform certain operations. In another embodiment, a "module" or "subsystem" may also comprise programmable logic or circuitry (as encompassed within a general-purpose processor or other programmable processor) that is temporarily configured by software to perform certain operations.

Accordingly, the term "module" or "subsystem" should be understood to encompass a tangible entity, be that an entity that is physically constructed permanently configured (hardwired) or temporarily configured (programmed) to operate in a certain manner and/or to perform certain operations described herein.

Although the explanation is limited to a single user and a single nominee, it should be understood by the person skilled in the art that the computing system is applied if there is more than one user and one nominee.

Referring now to the drawings, and more particularly to FIG. 1 through FIG. 8D, where similar reference characters denote corresponding features consistently throughout the figures, there are shown preferred embodiments and these embodiments are described in the context of the following exemplary system and/or method.

FIG. 1A is a block diagram illustrating an exemplary computing environment 100 for facilitating distributed peer to peer storage of data, in accordance with an embodiment of the present disclosure. According to FIG. 1A, the computing environment 100 includes one or more electronic devices 102 associated with a user communicatively coupled to a computing system 104 via a network 106. The one or more electronic devices 102 are used by the user for requesting the computing system 104 to securely store one or more files. In an embodiment of the present disclosure, the user may be a trustor who transmits the one or more files to one or more trustees for securely storing them. Further, the one or more electronic devices 102 are also used by the user to request the computing system 104 for securely accessing the one or more files, storing an encrypted metadata, and providing access of created one or more files to the user. In an exemplary embodiment of the present disclosure, the one or more electronic devices 102 may include a laptop computer, desktop computer, tablet computer, smartphone, wearable device, smart watch, and the like. In an embodiment of the present disclosure, the computing system 104 corresponds to a digital vault. In an embodiment of the present disclosure, the digital vault is a secure online platform where the user may collect and maintain his or her digital assets, logins and share access of the digital assets with trusted people. For example, the digital assets may include login information for online accounts, such as online banking, brokerage, cryptocurrency accounts and the like, social media accounts and email accounts or any other file. In an embodiment of the present disclosure, the computing system 104 is hosted on the one or more electronic devices 102. Further, the network 106 may be internet or any other wireless network.

Further, the computing environment 100 includes a storage server 108 communicatively coupled to the computing system 104 via the network 106. In an embodiment of the present disclosure, the storage server 108 may be a central server, such as cloud server or a remote server. In an embodiment of the present disclosure, the storage server 108 is an intermediate server which facilitates communication between the computing system 104 and one or more trustee devices 110 associated with the one or more trustees. The one or more trustees correspond to a list of users who act as trusted contacts of the user. Furthermore, data exchanged between the computing system 104 and the one or more trustee devices 110 via the storage server 108 is in encrypted format. In an exemplary embodiment of the present disclosure, the storage server 108 stores the encrypted metadata, a list of the one or more trustees and the like.

In an embodiment of the present disclosure, the computing environment ltk) includes the one or more trustee devices 110 associated with the one or more trustees communicatively coupled to the computing system 104 via the network 106. In an exemplary embodiment of the present disclosure, the one or more trustee devices 110 may include a laptop computer, desktop computer, tablet computer, smartphone, wearable device, smart watch, and the like. The one or more trustee devices 110 store an encrypted set of data chunks associated with each of the one or more files and a secondary decryption key to decrypt the encrypted metadata.

Furthermore, the one or more electronic devices 102 and the one or more trustee devices 110 include a local browser, a mobile application. or a combination thereof. Furthermore, the user and the one or more trustees may use a web application via the local browser, the mobile application, or a combination thereof to communicate with the computing system 104. In an embodiment of the present disclosure, the computing system 104 includes a plurality of modules 112. Details on the plurality of modules 112 have been elaborated in subsequent paragraphs of the present description with reference to FIG. 2.

In an embodiment of the present disclosure, the computing system 104 is configured to receive the request from the one or more electronic devices 102 associated with the user to securely store the one or more files. Further, the computing system 104 encrypts the one or more files by using one or more primary encryption keys upon receiving the request. The computing system 104 splits each of the encrypted one or more files into the encrypted set of data chunks based on the received request and one or more predefined criteria by using a file scrambler. The encrypted set of data chunks are in scrambled form. The computing system 104 transmits the encrypted set of data chunks associated with each of the encrypted one or more files to the one or more trustee devices 110 associated with the one or more trustees based on the received request and the one or more predefined criteria by using one or more transmission protocols. The computing system 104 encrypts the metadata associated with the encrypted set of data chunks by using the secondary encryption key. Furthermore, the computing system 104 receives a request from the one or more electronic devices 102 to securely access the one or more files. The computing system 104 obtains the encrypted set of data chunks and the secondary encryption key from the one or more trustee devices 110 based on the received request and the encrypted metadata by using the one or more transmission protocols. The computing system 104 creates the one or more files based on the encrypted set of data chunks, the obtained secondary encryption key, and the encrypted metadata by using the file scrambler. Further, the computing system 104 provides access of the created one or more files to the user.

Figure 1B:
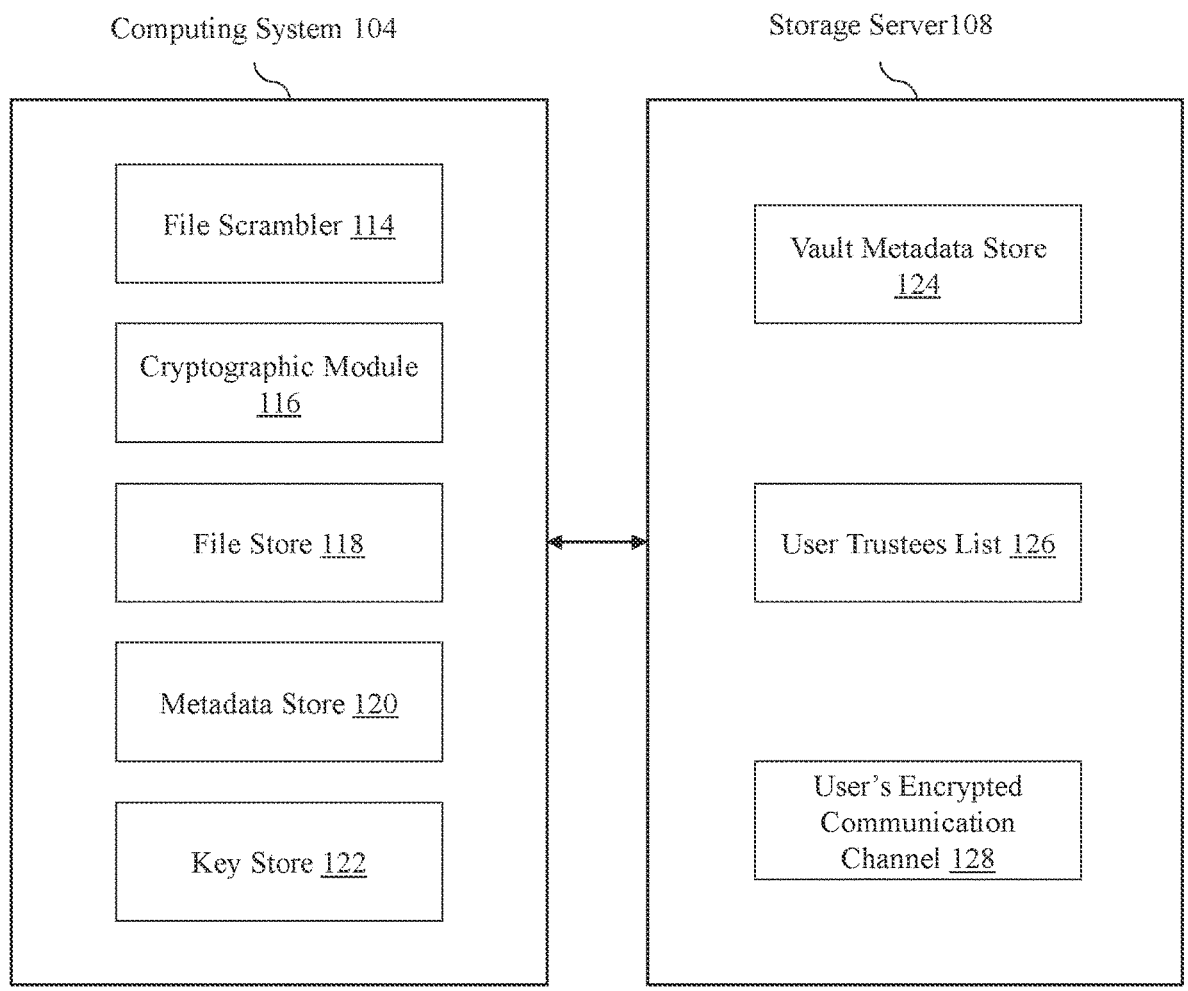
FIG. 1B is a block diagram illustrating an exemplary interaction between a computing system and a storage server, in accordance with an embodiment of the present disclosure.

FIG. 1B is a block diagram illustrating an exemplary interaction between the computing system 104 and the storage server 108, in accordance with an embodiment of the present disclosure. In an embodiment of the present disclosure, the interaction between the computing system 104 and the storage server 108 is performed via the network 106. Further, the computing system 104 hosted on the one or more electronic devices 102 includes a file scrambler 114, a cryptographic module 116, a file store 118, a metadata store 120 and a key store 122. The file scrambler 114 is configured to scramble bytes of the one or more files and split each of the one or more files into the encrypted set of data chunks. Further, the file scrambler 114 is also configured to deconstruct the one or more files from the scrambled and encrypted set of data chunks. The cryptographic module 116 corresponds to a file encryption module and a file creation module. In an embodiment of the present disclosure, the cryptographic module 116 is configured to encrypt and decrypt the one or more files. Furthermore, the metadata store 120, the key store 122 and the file store 118 corresponds to a storage unit. Details on the file encryption module, the file creation module and the storage unit have been elaborated in subsequent paragraphs of the present description with reference to FIG. 2. The file store 118 is configured to store the encrypted set of data chunks of the one or more files associated with the user and the one or more trustees. Further, the metadata store 120 is configured to store the encrypted metadata of a file, such as name of the file, encryption keys, information on chunks the file is split into, including which trustee it is synced with, the sync status and the like. The key store 122 stores the secondary key used for encryption of the metadata. In an embodiment of the present disclosure, the key store 122 is present inside the one or more trustee devices 110. Further, the storage server 108 includes a vault metadata store 124, a user trustees list 126 and a user's encrypted communication channel 128. The vault metadata store 124 is configured to store the encrypted metadata of the digital vault i.e., information stored in the metadata store 120 in the digital vault. The vault metadata store 124 also stores information of trustees mapped to the digital vault and nominees assigned to the digital vault. The user trustees list 126 is a list of all trustees of the user. Furthermore, the user's encrypted communication channel 128 facilitates exchange of data between the user, the one or more trustees and a nominee.

Figure 2:
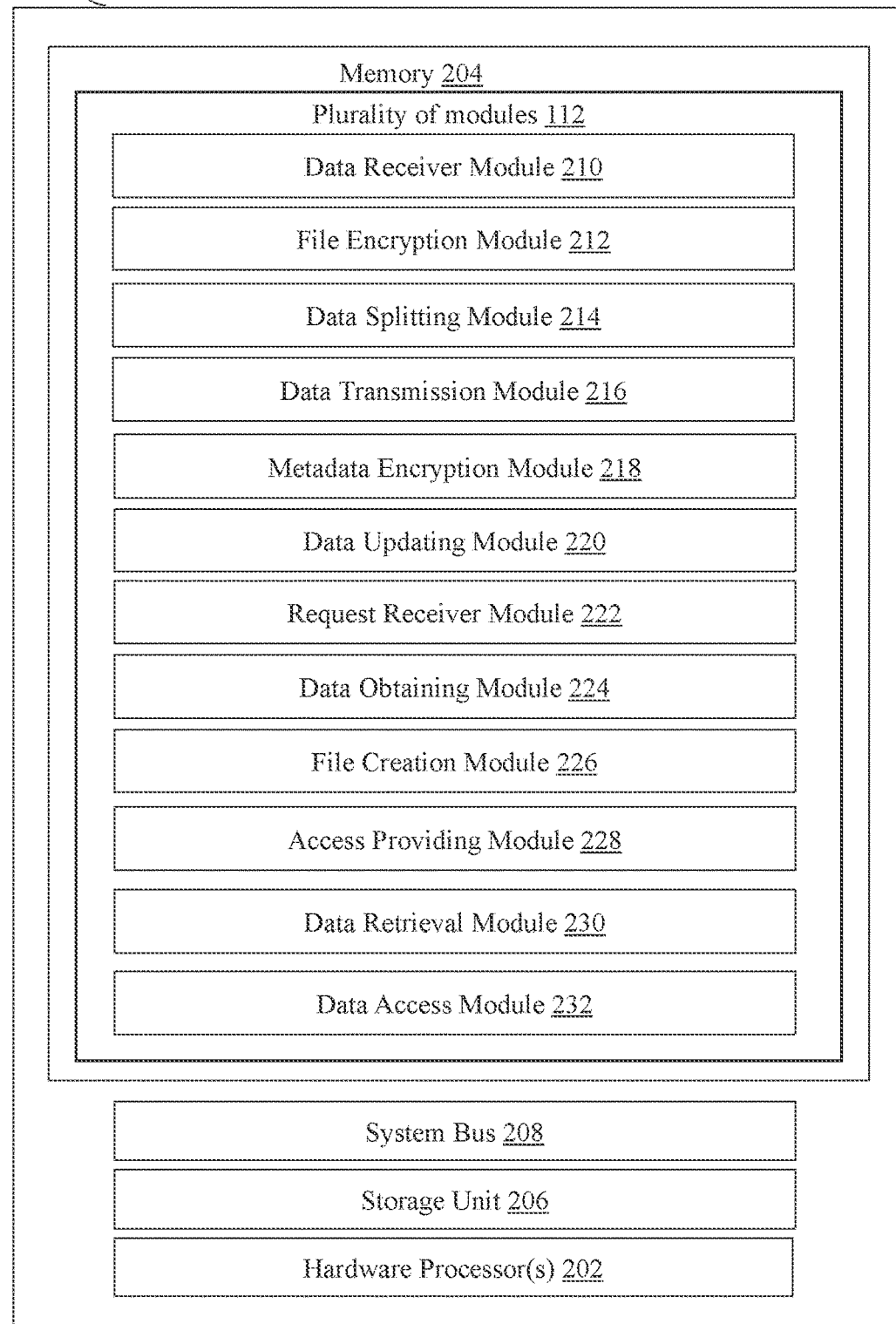
FIG. 2 is a block diagram illustrating the exemplary computing system for facilitating distributed peer to peer storage of data, in accordance with an embodiment of the present disclosure.

FIG. 2 is a block diagram illustrating an exemplary computing system 104 facilitating distributed peer to peer storage of data, in accordance with an embodiment of the present disclosure. In an embodiment of the present disclosure, the computing system 104 corresponds to the digital vault. The digital vault is a secure online platform where the user may collect and maintain his or her digital assets, logins and share access of the digital assets with trusted people. For example, the digital assets may include login information for online accounts, such as online banking, brokerage, cryptocurrency accounts and the like, social media accounts and email accounts or any other file. Further, the computing system 104 includes one or more hardware processors 202, a memory 204 and a storage unit 206. The one or more hardware processors 202, the memory 204 and the storage unit 206 are communicatively coupled through a system bus 208 or any similar mechanism. The memory 204 comprises the plurality of modules 112 in the form of programmable instructions executable by the one or more hardware processors 202. Further, the plurality of modules 112 includes a data receiver module 210, a file encryption module 212, a data splitting module 214, a data transmission module 216, a metadata encryption module 218, a data updating module 220, a request receiver module 222, a data obtaining module 224, a file creation module 226, an access providing module 228, a data retrieval module 230 and a data access module 232.

The one or more hardware processors 202, as used herein, means any type of computational circuit, such as, but not limited to, a microprocessor unit, microcontroller, complex instruction set computing microprocessor unit, reduced instruction set computing microprocessor unit, very long instruction word microprocessor unit, explicitly parallel instruction computing microprocessor unit, graphics processing unit, digital signal processing unit, or any other type of processing circuit. The one or more hardware processors 202 may also include embedded controllers, such as generic or programmable logic devices or arrays, application specific integrated circuits, single-chip computers, and the like.

The memory 204 may be non-transitory volatile memory and non-volatile memory. The memory 204 may be coupled for communication with the one or more hardware processors 202, such as being a computer-readable storage medium. The one or more hardware processors 202 may execute machine-readable instructions and/or source code stored in the memory 204. A variety of machine-readable instructions may be stored in and accessed from the memory 204. The memory 204 may include any suitable elements for storing data and machine-readable instructions, such as read only memory, random access memory, erasable programmable read only memory, electrically erasable programmable read only memory, a hard drive, a removable media drive for handling compact disks, digital video disks, diskettes, magnetic tape cartridges, memory cards, and the like. In the present embodiment, the memory 204 includes the plurality of modules 112 stored in the form of machine-readable instructions on any of the above-mentioned storage media and may be in communication with and executed by the one or more hardware processors 202.

The storage unit 206 may be correspond to one or more external storage devices associated with the one or more electronic devices 102 or an internal storage of the one or more electronic devices 102. In an exemplary embodiment of the present disclosure, the one or more external storage devices include Secure Digital (SD) card, external hard-drives, and the like. The storage unit may store the received request, the one or more predefined criteria, the encrypted metadata, the encrypted metadata, the one or more files and the like.

In an embodiment of the present disclosure, the digital vault is created by the user in the one or more electronic devices 102 by assigning one or more trusted acquaintances as the one or more trustees of the digital vault. The one or more trustees correspond to a list of users who act as trusted contacts of the user. For example, the one or more trusted acquaintances may be family, friends, colleagues, and the like. In an embodiment of the present disclosure, the list of users is synced with the storage server 108. The user may create different vaults with different sets of trustees for various categories of files.

The data receiver module 210 is configured to receive the request from the one or more electronic devices 102 associated with the user to securely store the one or more files. In an exemplary embodiment of the present disclosure, the request includes the one or more trustees, the number of the one or more trustees, the nominee, the one or more files, the number of the one or more files and type of the one or more files. For example, the user may optionally assign the one or more trusted acquaintances as nominee to any of his or her vault. The nominee may be selected from the list of trusted contacts of the user. For example, the one or more files may include bank documents, identification documents, login ID, passwords, and the like. The type of the one or more files may be sensitive, personal and the like. In an exemplary embodiment of the present disclosure, the one or more electronic devices 102 may include a laptop computer, desktop computer, tablet computer, smartphone, wearable device, smart watch, and the like. In an embodiment of the present disclosure, the user may be a trustor who transmits the one or more files to the one or more trustees for securely storing them.

The file encryption module 212 is configured to encrypt the one or more files by using the one or more primary encryption keys upon receiving the request. In an embodiment of the present disclosure, each of the one or more files are encrypted by using a different primary encryption key. In an exemplary embodiment of the present disclosure, the file encryption module 212 uses symmetric encryption to encrypt the one or more files. Thus, the one or more primary encryption keys may also be used for decrypting the one or more files. In another embodiment of the present disclosure, the file encryption module 212 uses asymmetric encryption to encrypt the one or more files.

The data splitting module 214 is configured to split each of the encrypted one or more files into the encrypted set of data chunks based on the received request and the one or more predefined criteria by using the file scrambler 114. In an embodiment of the present disclosure, the encrypted set of data chunks are in scrambled form. In an embodiment of the present disclosure, the file scrambler 114 scrambles bytes of the one or more files and splits each of the one or more files into the encrypted set of data chunks. Further, the one or more predefined criteria include that no trustee gets all encrypted data chunks of the one or more files. The one or more predefined criteria may also include that no trustees less than a majority number are allowed to collectively hold the encrypted set of data chunks, a group of trustees formed by a predefined number of trustees is allowed to collectively account for the encrypted set of data chunks or the one or more trustees are allowed to collectively account for the encrypted set of data chunks. In an embodiment of the present disclosure, the majority number corresponds to a group of trustees formed by association of majority of the one or more trustees. For example, when there are five trustees, then there should at least be any three trustees to be able to collectively account for all data chunks. In another example, when there are 5 trustees, the predefined number may be any number less than five i.e., two, three and the like.

The data transmission module 216 is configured to transmit the encrypted set of data chunks associated with each of the encrypted one or more files to the one or more trustee devices 110 associated with the one or more trustees based on the received request and the one or more predefined criteria by using the one or more transmission protocols. In an exemplary embodiment of the present disclosure, the one or more trustee devices 110 may include a laptop computer, desktop computer, tablet computer, smartphone, wearable device, smart watch and the like. In an exemplary embodiment of the present disclosure, the one or more transmission protocols include a peer-to-peer communication protocol, an end-to-end encryption via the storage server 108 or a combination thereof. The storage server 108 transmits data from the one or more electronic devices 102 to the one or more trustee devices 110 and deletes copy of the data upon successful transmission. For example, the storage server 108 acts as an intermediate server which pushes the data to the one or more trustees when they come online and purges its copy after syncing successfully. In an embodiment of the present disclosure, the one or more trustees and the one or more trustee devices 110 are unaware at any point in time regarding contents of the digital vault, such as the number, types of the one or more files, what data-chunk belongs to what file and the like.

The metadata encryption module 218 is configured to encrypt the metadata associated with the encrypted set of data chunks by using the secondary encryption key. In an embodiment of the present disclosure, the secondary encryption key is synced with the one or more trustee devices 110 via the one or more transmission protocols. Further, the encrypted metadata is synced or stored in the one or more electronic devices 102 and the storage server 108. In an exemplary embodiment of the present disclosure, the metadata encryption module 218 uses symmetric encryption to encrypt the metadata. Thus, the secondary encryption keys may also be used for decrypting the metadata. In an exemplary embodiment of the present disclosure, the metadata includes name of each of the one or more files, file extension, number of the encrypted set of data chunks, name of each of the encrypted set of data chunks, the one or more primary encryption keys, a mapping of one or more encrypted data chunks held by each of the one or more trustees and the like.

In an embodiment of the present disclosure, the data updating module 220 is configured to update the metadata based on one or more actions performed by the user. In an exemplary embodiment of the present disclosure, the one or more actions include creating, deleting, and editing a file. Further, the data updating module 220 encrypts the updated metadata by using the secondary encryption key. In an embodiment of the present disclosure, the encrypted updated metadata is stored in the one or more electronic devices 102 and the storage server 108. In an event where a trustee loses the data or his or her trustee device, the one or more electronic devices 102 are notified of the lost data and data chunks associated with the trustee devices are resynced back. Further, when a trustee opts out, the trustor is notified to replace the trustee.

The request receiver module 222 is configured to receive the request from the one or more electronic devices 102 to securely access the one or more files.

The data obtaining module 224 is configured to obtain the encrypted set of data chunks and the secondary encryption key from the one or more trustee devices 110 based on the received request and the encrypted metadata by using the one or more transmission protocols. In an embodiment of the present disclosure, the encrypted set of data chunks are obtained from the one or more trustee devices 110 upon decrypting the metadata.

The file creation module 226 is configured to create the one or more files based on the encrypted set of data chunks, the obtained secondary encryption key, and the encrypted metadata by using the file scrambler 114. In creating the one or more files based on the encrypted set of data chunks, the obtained secondary encryption key, and the encrypted metadata by using the file scrambler 114, the file creation module 226 decrypts the encrypted metadata by using a secondary decryption key. Since the symmetric encryption is used to encrypt the metadata, the secondary encryption key used for encrypting the metadata and the secondary decryption key used for decrypting the metadata are same. In another embodiment of the present disclosure, an asymmetric encryption is used to encrypt the metadata. Thus, the secondary encryption key used for encrypting the metadata and the secondary decryption key used for decrypting the metadata are different. Further, the file creation module 226 decrypts the encrypted set of data chunks associated with each of the encrypted one or more files by using one or more primary decryption keys upon decrypting the encrypted metadata. Since the symmetric encryption is used to encrypt the one or more files, the one or more primary encryption keys used for encrypting the one or more files and the one or more primary decryption keys used for decrypting the encrypted set of data chunks are same. In another embodiment of the present disclosure, the asymmetric encryption is used to encrypt the one or more files. Thus, the one or more primary encryption keys used for encrypting the one or more files and the one or more primary decryption keys used for decrypting the encrypted set of data chunks are different.

The file creation module 226 creates the one or more files based on the decrypted set of data chunks and the decrypted metadata by using the file scrambler 114. In an embodiment of the present disclosure, the file scrambler 114 deconstructs the one or more files from the scrambled and encrypted set of data chunks.

The access providing module 228 is configured to provide access of the created one or more files to the user.

The data retrieval module 230 is configured to receive a login request from the user in case of one or more events. In an exemplary embodiment of the present disclosure, the one or more events include loss of the one or more electronic devices 102, loss of data and the like. Further, the data retrieval module 230 authenticates identity of the user via one or more authentication mechanisms upon receiving the login request. In an exemplary embodiment of the present disclosure, the one or more authentication mechanisms include email id authentication, social login, phone authentication, or any combination thereof. When the user logs back in upon successful authentication of the identity, the user's account gets locked, such that he or she is not able to see any data or any details of the digital vault. In an embodiment of the present disclosure, upon account lock, one or more notifications are sent to the one or more trustee devices 110, such that the one or more trustees may either grant access or deny access to the user upon verification of the user's identity by one or means. The data retrieval module 230 generates the one or more notifications for requesting the one or more trustees to grant access of the secondary decryption key based on the received login request upon successful authentication of the identity. In an embodiment of the present disclosure, the generated one or more notifications are transmitted to the one or more trustee devices 110. In an embodiment of the present disclosure, the secondary decryption key is same as the secondary encryption key as symmetric encryption is used for encrypting the metadata. In another embodiment of the present disclosure, the secondary decryption key is different from the secondary encryption key as the asymmetric encryption is used for encrypting the metadata. Furthermore, the data retrieval module 230 receives the secondary decryption key from the one or more trustee devices 110 by using the one or more transmission protocols when predefined number of trustees accept the request to grant access. In an embodiment of the present disclosure, the predefined number of trustees accept the request upon successful verification of the identity of the user via the one or more means. In an exemplary embodiment of the present disclosure, the predefined number of trustees may be a number, majority or unanimous. For example, the predefined number of trustees may be three out of seven one or more trustees. In an exemplary embodiment of the present disclosure, the one or more means include asking predefined questions, one or more offline verification approaches, image verification, password verification and the like. The user may access the digital vault upon successful verification of the identity of the user. For example, the one or more offline verification approaches may be calling the user to verify his identity. The data retrieval module 230 obtains the encrypted metadata from the storage server 108 upon receiving the secondary decryption key. Furthermore, the data retrieval module 230 receives the encrypted set of data chunks from the one or more trustee devices 110 based the obtained encrypted metadata by using the one or more transmission protocols when the predefined number of trustees accept the request to grant access upon obtaining the encrypted metadata. If the trustees do not accept the request to grant access or even one trustee approval fell short for a specific vault, the one or more electronic devices 102 may not have enough data to reconstruct any file back. In an embodiment of the present disclosure, the obtained encrypted metadata is decrypted by using the secondary decryption key, such that the encrypted set of data chunks may be received from the one or more trustee devices 110 by using the decrypted metadata. Further, the obtained encrypted set of data chunks are decrypted by using the one or more primary keys and the decrypted set of data chunks are used to create the one or more files based on the decrypted metadata by using the file scrambler 114.

The data access module 232 receives an access request from the nominee to access the encrypted set of data chunks stored in the one or more trustee devices 110. In an embodiment of the present disclosure, the access request includes one or more predefined reasons of accessing the encrypted set of data chunks. For example, the one or more predefined reasons may be that the user is incapacitated, and the nominee needs funds. In an embodiment of the present disclosure, when the user assigns the nominee, the user may leave a message to the nominee that describes what do the one or more files contain and when the nominee may request access of the one or more files. The message is displayed to the nominee at the time of request. Further, the data access module 232 generates one or more notifications for requesting the one or more trustees to allow access of the encrypted metadata stored in the storage unit based on the received access request. In an embodiment of the present disclosure, the generated one or more notifications are transmitted to the one or more trustee devices 110. The one or more predefined reasons are outputted on graphical user interface screen of the one or more trustee devices 110, such that the one or more trustees may decide if the one or more predefined reasons are valid. In an embodiment of the present disclosure, the trustor may leave an instruction to the one or more trustees detailing the one or more predefined reasons under which the one or more trustees may approve the access request. The instruction is displayed to the one or more trustees after the nominee has requested access to the one or more files. For example, when the user is not available in case of an emergency, such as the user is incapacitated and the nominee requires access to the bank passwords stored in the digital vault, the nominee may raise the access request to the one or more trustees from the application. Furthermore, the data access module 232 syncs or obtains the encrypted metadata from the storage server 108 when the one or more predefined reasons are valid, and the predefined number of trustees accept the request to allow access. In an embodiment of the present disclosure, the predefined number of trustees accept the request upon verification of the reason for request of the nominee via the one or more means. The data access module 232 receives the encrypted set of data chunks from the one or more trustee devices 110 based on the obtained encrypted metadata by using the one or more transmission protocols upon obtaining the encrypted metadata. In an embodiment of the present disclosure, the obtained encrypted metadata is decrypted by using the secondary decryption key, such that the encrypted set of data chunks may be synced or received from the one or more trustee devices 110 by using the decrypted metadata. In an embodiment of the present disclosure, the nominee already has the secondary decryption key for the encrypted metadata as he or she is a trusted contact. The user may revoke access of the nominee to the one or more files at any point of time, such that the one or more files are purged and the digital vault is locked. Further, the obtained encrypted set of data chunks are decrypted by using the one or more primary keys and the decrypted set of data chunks are used to reconstruct or create the one or more files based on the decrypted metadata by using the file scrambler 114. In an embodiment of the present disclosure, the nominee or nominees may be a different list of users from the one or more trustees or there may be an overlap of one or more trustees and the nominees when the one or more of the trustees are also nominees. When the one or more trustees are also nominees, the nominee's raise request is auto approved from their role as trustee when they raise the access request. However, it is still required to meet the minimum approval requirement and wait for approval from other trustees.

Figure 3:
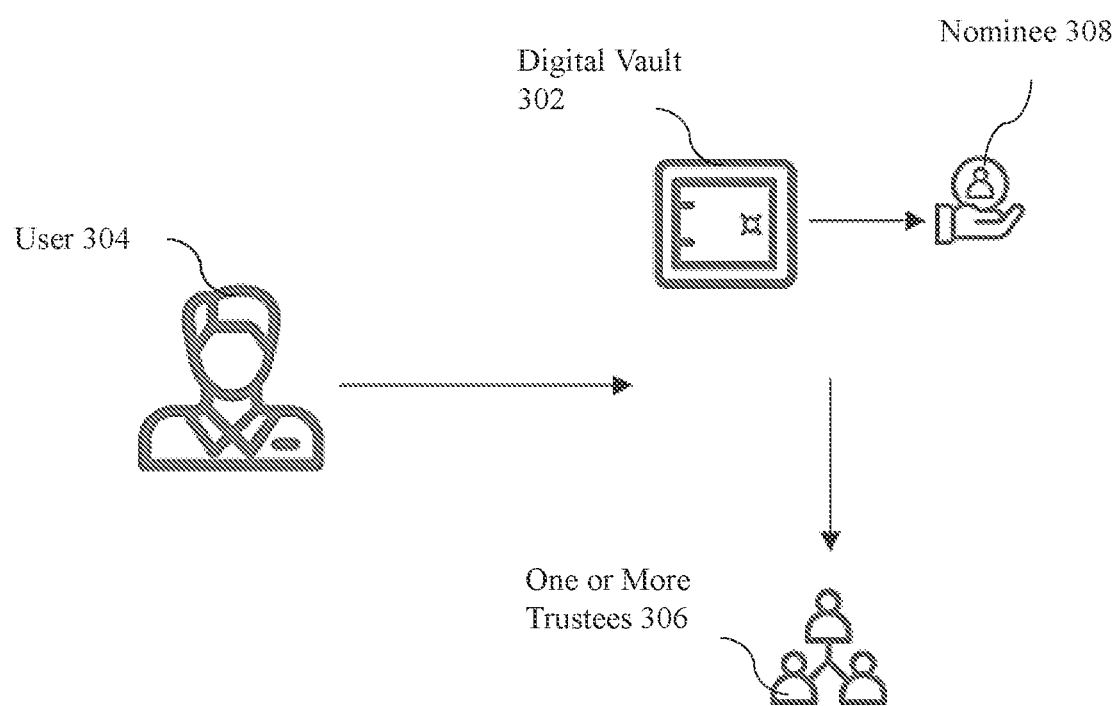
FIG. 3 is an exemplary schematic representation illustrating creation of a digital vault, in accordance with an embodiment of the present disclosure.

FIG. 3 is a block diagram illustrating an exemplary schematic representation of creation of a digital vault 302, in accordance with an embodiment of the present disclosure. In an embodiment of the present disclosure, the digital vault 302 is created by the user 304 in the one or more electronic devices 102 by assigning one or more trusted acquaintances as the one or more trustees 306 of the digital vault 302. The one or more trustees 306 correspond to a list of users who act as trusted contacts of the user 304. For example, the one or more trusted acquaintances may be family, friends, colleagues and the like. In an embodiment of the present disclosure, the list of users is synced with the storage server 108. Further, the user 304 may also appoint the nominee 308 from the one or more trusted acquaintances.

Figure 4:
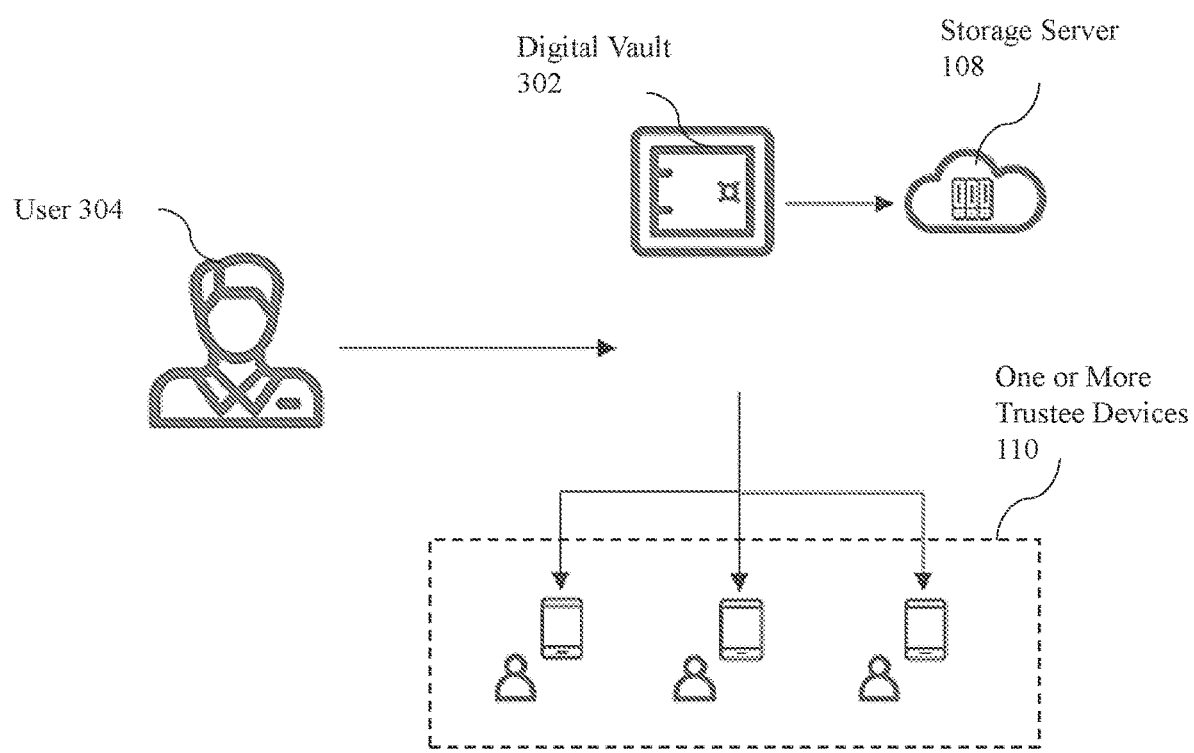
FIG. 4 is an exemplary schematic representation illustrating operation of the computing system for facilitating distributed peer to peer storage of data, in accordance with an embodiment of the present disclosure.

FIG. 4 is an exemplary schematic representation illustrating operation of the computing system 104 for facilitating distributed peer to peer storage of data, in accordance with an embodiment of the present disclosure. In an embodiment of the present disclosure, the user 304 adds a file or data to the computing system 104 i.e., digital vault 302. Further, the computing system 104 encrypts, scrambles, and splits the file or the data into the encrypted set of data chunks based on one or more predefined criteria by using the file scrambler 114. In an embodiment of the present disclosure, the metadata is encrypted by using the secondary encryption key and the encrypted metadata is synced with the storage unit. Furthermore, the encrypted set of data chunks are transmitted to the one or more trustee devices 110 associated with the one or more trustees 306 based on the one or more predefined criteria by using the one or more transmission protocols. In an exemplary embodiment of the present disclosure, the one or more transmission protocols include the peer-to-peer communication protocol, the end-to-end encryption via the storage server 108 or a combination thereof. The user 304 may at any time request the encrypted metadata and the encrypted set of data chunks to reconstruct the one or more files.

Figure 5:
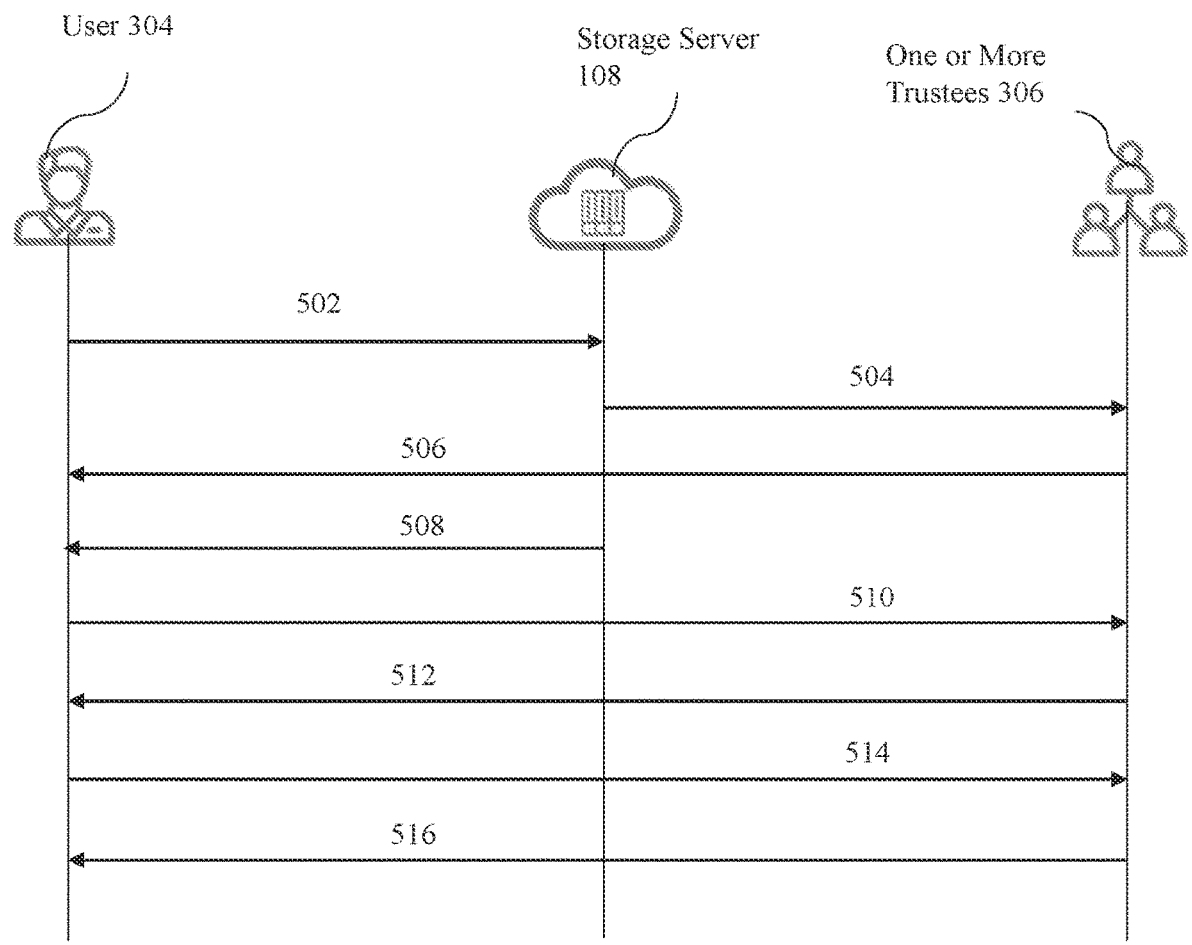
FIG. 5 is an exemplary sequence flow diagram illustrating retrieval of data by a user, in accordance with an embodiment of the present disclosure.

FIG. 5 is an exemplary sequence flow diagram illustrating retrieval of data by the user 304, in accordance with an embodiment of the present disclosure. At step 502, the user 304 requests the server to login into the digital vault 302 via the one or more electronic devices 102. In an embodiment of the present disclosure, account of the user 304 is locked. Further at 504, an authorization request requesting login goes to the one or more trustees 306 to authorize the user 304 to access the digital vault 302. At step 506, the user 304 is authorized to login into the computing system 104 upon successful verification. At step 508, encrypted metadata is synced from the storage server 108 to the one or more electronic devices 102 of the user 304. Also, the account is unlocked, and the secondary encryption key is synced. Furthermore, at step 510, the user 304 sends a data retrieval request to the one or more trustee devices 110. At step 512, the one or more trustees 306 approve the data retrieval request. In an embodiment of the present disclosure, the data retrieval request is approved when the predefined number of trustees accept the request. At step 514, the user 304 requests the access of the encrypted set of data chunks when the data retrieval request is approved. At step 516, the one or more trustee devices 110 sends the encrypted set of data chunks to the one or more electronic devices 102. In an embodiment of the present disclosure, the one or more files are reconstructed based on the secondary encryption key, the encrypted set of data chunks and the encrypted metadata.

Figure 6:
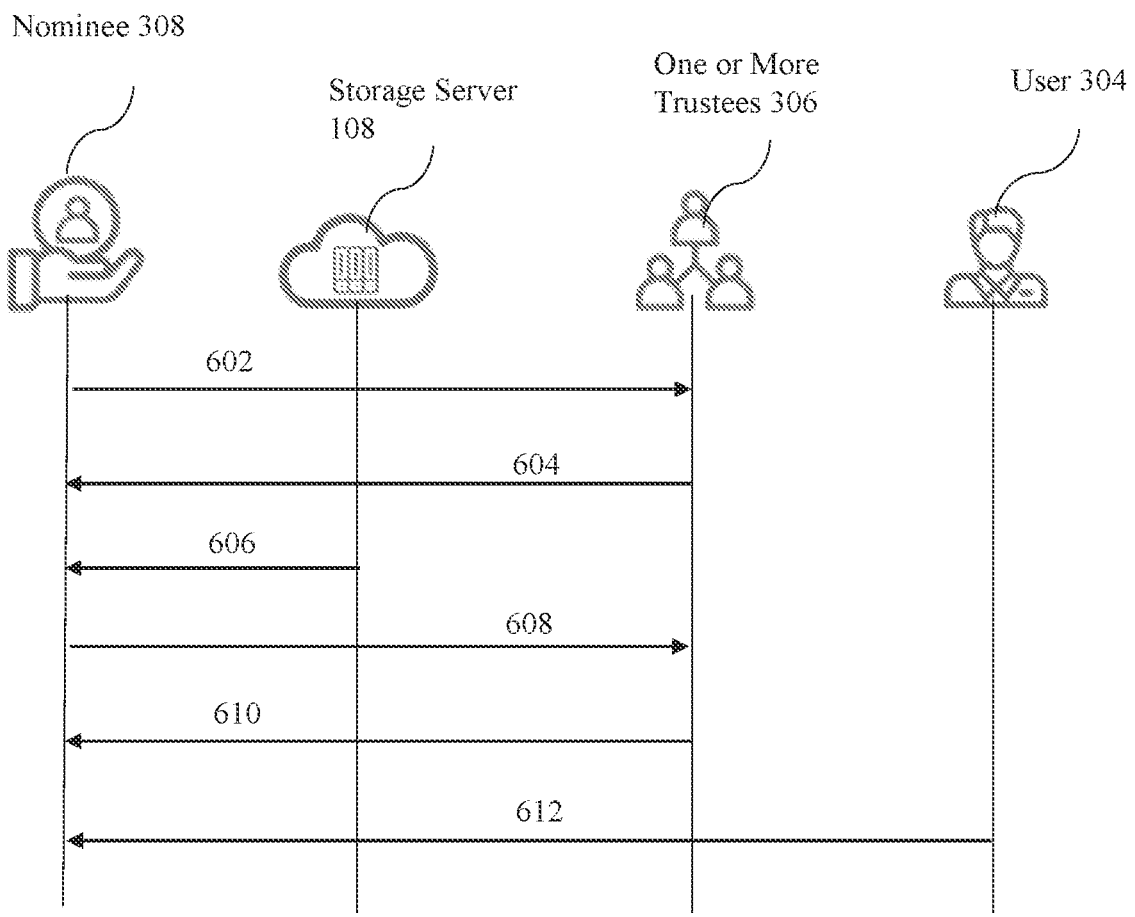
FIG. 6 is an exemplary sequence flow diagram illustrating retrieval of data by a nominee, in accordance with an embodiment of the present disclosure.

FIG. 6 is an exemplary sequence flow diagram illustrating retrieval of data by the nominee 308, in accordance with an embodiment of the present disclosure. At step 602, the nominee 308 request access to data from the one or more trustees 306. At step 604, majority of the one or more trustees 306 authorizes the request after verification. Further at step 606, the encrypted metadata is synced from the server to the nominee device. The nominee 308 may already have the secondary encryption key synced. At step 608, the nominee 308 requests the encrypted set of data chunks from the one or more trustees 306. At step 610, the one or more trustees 306 sends the encrypted set of data chunks to the nominee 308. In an embodiment of the present disclosure, the one or more files are reconstructed based on the secondary encryption key, the encrypted set of data chunks and the encrypted metadata. The nominee 308 may access the reconstructed one or more files. At step 612, the user 304 revokes access of the one or more files at any point in time, such that the one or more files are purged, and the digital vault 302 is locked for the nominee.

Figure 7:
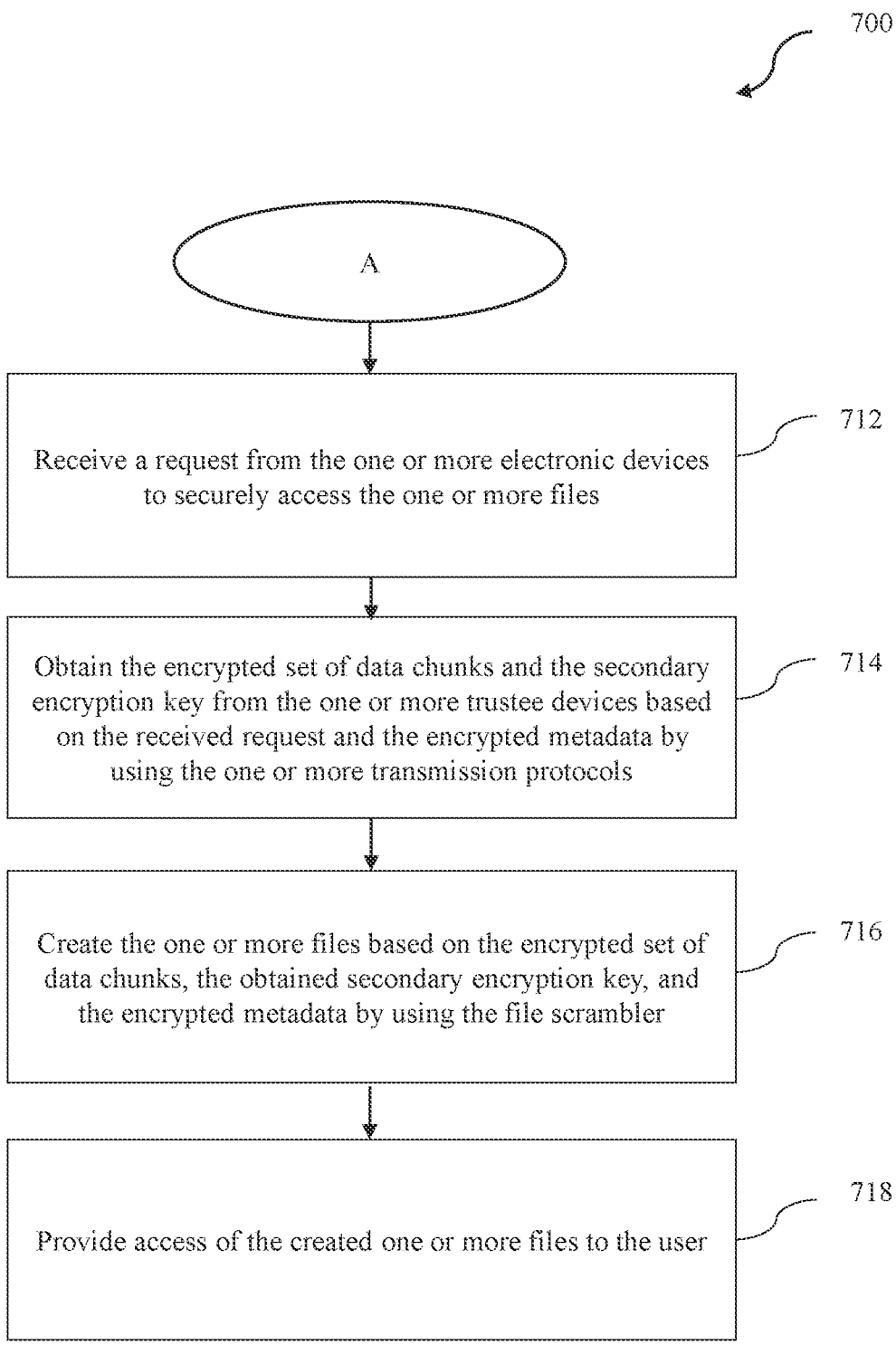
FIG. 7 is a process flow diagram illustrating an exemplary method for facilitating distributed peer to peer storage of data, in accordance with an embodiment of the present disclosure.

FIG. 7 is a process flow diagram illustrating an exemplary method 700 for facilitating distributed peer to peer storage of data, in accordance with an embodiment of the present disclosure. In an embodiment of the present disclosure, the method 700 corresponds to a digital vault. The digital vault is a secure online platform where a user may collect and maintain his or her digital assets, logins and share access of the digital assets with trusted people. For example, the digital assets may include login information for online accounts, such as online banking, brokerage, cryptocurrency accounts and the like, social media accounts and email accounts or any other file. In an embodiment of the present disclosure, the digital vault is created by the user in one or more electronic devices 102 by assigning one or more trusted acquaintances as the one or more trustees of the digital vault. The one or more trustees correspond to a list of users who act as trusted contacts of the user. For example, the one or more trusted acquaintances may be family, friends, colleagues, and the like. In an embodiment of the present disclosure, the list of users is synced with a storage server 108. The user may create different vaults with different sets of trustees for various categories of files.

At step 502, a request is received from the one or more electronic devices 102 associated with the user to securely store one or more files. In an exemplary embodiment of the present disclosure, the request includes the one or more trustees, the number of the one or more trustees, the nominee, the one or more files, the number of the one or more files and type of the one or more files. For example, the user may optionally assign the one or more trusted acquaintances as nominee to any of his or her vault. The nominee may be selected from the list of trusted contacts of the user. For example, the one or more files may include bank documents, identification documents, login ID, passwords, and the like. The type of the one or more files may be sensitive, personal and the like. In an exemplary embodiment of the present disclosure, the one or more electronic devices 102 may include a laptop computer, desktop computer, tablet computer, smartphone, wearable device, smart watch, and the like. In an embodiment of the present disclosure, the user may be a trustor who transmits the one or more files to the one or more trustees for securely storing them.

At step 704, the one or more files are encrypted by using one or more primary encryption keys upon receiving the request. In an embodiment of the present disclosure, each of the one or more files are encrypted by using a different primary encryption key. In an exemplary embodiment of the present disclosure, symmetric encryption is used to encrypt the one or more files. Thus, the one or more primary encryption keys may also be used for decrypting the one or more files. In another embodiment of the present disclosure, asymmetric encryption may also be used to encrypt the one or more files.

At step 706, each of the encrypted one or more files is split into an encrypted set of data chunks based on the received request and one or more predefined criteria by using a file scrambler 114. In an embodiment of the present disclosure, the encrypted set of data chunks are in scrambled form. In an embodiment of the present disclosure, the file scrambler 114 scrambles bytes of the one or more files and splits each of the one or more files into the encrypted set of data chunks. Further, the one or more predefined criteria include that no trustee gets all encrypted data chunks of the one or more files. The one or more predefined criteria may also include that no trustees less than a majority number are allowed to collectively hold the encrypted set of data chunks, a group of trustees formed by a predefined number of trustees is allowed to collectively account for the encrypted set of data chunks or the one or more trustees are allowed to collectively account for the encrypted set of data chunks. In an embodiment of the present disclosure, the majority number corresponds to a group of trustees formed by association of majority of the one or more trustees. For example, when there are five trustees, then there should at least be any three trustees to be able to collectively account for all data chunks. In another example, when there are 5 trustees, the predefined number may be any number less than five i.e., two, three and the like.

At step 708, the encrypted set of data chunks associated with each of the encrypted one or more files are transmitted to one or more trustee devices 110 associated with the one or more trustees based on the received request and the one or more predefined criteria by using one or more transmission protocols. In an exemplary embodiment of the present disclosure, the one or more trustee devices 110 may include a laptop computer, desktop computer, tablet computer, smartphone, wearable device, smart watch and the like. In an exemplary embodiment of the present disclosure, the one or more transmission protocols include a peer-to-peer communication protocol, an end-to-end encryption via the storage server 108 or a combination thereof. The storage server 108 transmits data from the one or more electronic devices 102 to the one or more trustee devices 110 and deletes copy of the data upon successful transmission. For example, the storage server 108 acts as an intermediate server which pushes the data to the one or more trustees when they come online and purges its copy after syncing successfully. In an embodiment of the present disclosure, the one or more trustees and the one or more trustee devices 110 are unaware at any point in time regarding contents of the digital vault, such as the number, types of the one or more files, what data-chunk belongs to what file and the like.

At step 710, a metadata associated with the encrypted set of data chunks is encrypted by using a secondary encryption key. In an embodiment of the present disclosure, the secondary encryption key is synced with the one or more trustee devices 110 via the one or more transmission protocols. Further, the encrypted metadata is synced or stored in the one or more electronic devices 102 and the storage server 108. In an exemplary embodiment of the present disclosure, symmetric encryption is used to encrypt the metadata. Thus, the secondary encryption keys may also be used for decrypting the metadata. In an exemplary embodiment of the present disclosure, the metadata includes name of each of the one or more files, file extension, number of the encrypted set of data chunks, name of each of the encrypted set of data chunks, the one or more primary encryption keys, a mapping of one or more encrypted data chunks held by each of the one or more trustees and the like.

In an embodiment of the present disclosure, the method 700 includes updating the metadata based on one or more actions performed by the user. In an exemplary embodiment of the present disclosure, the one or more actions include creating, deleting, and editing a file. Further, the method 700 includes encrypting the updated metadata by using the secondary encryption key. In an embodiment of the present disclosure, the encrypted updated metadata is stored in the one or more electronic devices 102 and the storage server 108. In an event where a trustee loses the data or his or her trustee device, the one or more electronic devices 102 are notified of the lost data and data chunks associated with the trustee devices are resynced back. Further, when a trustee opts out, the trustor is notified to replace the trustee.

At step 712, a request is received from the one or more electronic devices 102 to securely access the one or more files.

At step 714, the encrypted set of data chunks and the secondary encryption key are obtained from the one or more trustee devices 110 based on the received request and the encrypted metadata by using the one or more transmission protocols. In an embodiment of the present disclosure, the encrypted set of data chunks are obtained from the one or more trustee devices 110 upon decrypting the metadata.

At step 716, the one or more files are created based on the encrypted set of data chunks, the obtained secondary encryption key, and the encrypted metadata by using the file scrambler 114. In creating the one or more files based on the encrypted set of data chunks, the obtained secondary encryption key, and the encrypted metadata by using the file scrambler 114, the method 700 includes decrypting the encrypted metadata by using a secondary decryption key. Since the symmetric encryption is used to encrypt the metadata, the secondary encryption key used for encrypting the metadata and the secondary decryption key used for decrypting the metadata are same. In another embodiment of the present disclosure, an asymmetric encryption is used to encrypt the metadata. Thus, the secondary encryption key used for encrypting the metadata and the secondary decryption key used for decrypting the metadata are different. Further, the method 700 includes decrypting the encrypted set of data chunks associated with each of the encrypted one or more files by using one or more primary decryption keys upon decrypting the encrypted metadata. Since the symmetric encryption is used to encrypt the one or more files, the one or more primary encryption keys used for encrypting the one or more files and the one or more primary decryption keys used for decrypting the encrypted set of data chunks are same. In another embodiment of the present disclosure, the asymmetric encryption is used to encrypt the one or more files. Thus, the one or more primary encryption keys used for encrypting the one or more files and the one or more primary decryption keys used for decrypting the encrypted set of data chunks are different. The method 700 includes creating the one or more files based on the decrypted set of data chunks and the decrypted metadata by using the file scrambler 114. In an embodiment of the present disclosure, the file scrambler 114 deconstructs the one or more files from the scrambled and encrypted set of data chunks.

At step 718, access of the created one or more files is provided to the user.

The method 700 includes receiving a login request from the user in case of one or more events. In an exemplary embodiment of the present disclosure, the one or more events include loss of the one or more electronic devices 102, loss of data and the like. Further, the method 700 includes authenticating identity of the user via one or more authentication mechanisms upon receiving the login request. In an exemplary embodiment of the present disclosure, the one or more authentication mechanisms include email id authentication, social login, phone authentication, or any combination thereof. When the user logs back in upon successful authentication of the identity, the user's account gets locked, such that he or she is not able to see any data or any details of the digital vault. In an embodiment of the present disclosure, upon account lock, one or more notifications are sent to the one or more trustee devices 110, such that the one or more trustees may either grant access or deny access to the user upon verification of the user's identity by one or means. method 700 includes generating the one or more notifications for requesting the one or more trustees to grant access of the secondary decryption key based on the received login request upon successful authentication of the identity. In an embodiment of the present disclosure, the generated one or more notifications are transmitted to the one or more trustee devices 110. In an embodiment of the present disclosure, the secondary decryption key is same as the secondary encryption key as the symmetric encryption is used for encrypting the metadata. In another embodiment of the present disclosure, the secondary decryption key is different from the secondary encryption key as the asymmetric encryption is used for encrypting the metadata. Furthermore, the method 700 includes receiving the secondary decryption key from the one or more trustee devices 110 by using the one or more transmission protocols when predefined number of trustees accept the request to grant access. In an embodiment of the present disclosure, the predefined number of trustees accept the request upon successful verification of the identity of the user via the one or means. In an exemplary embodiment of the present disclosure, the predefined number of trustees may be a number, majority or unanimous. For example, the predefined number of trustees may be three out of seven one or more trustees. In an exemplary embodiment of the present disclosure, the one or more means include asking predefined questions, one or more offline verification approaches, image verification, password verification and the like. The user may access the digital vault upon successful verification of the identity of the user. For example, the one or more offline verification approaches may be calling the user to verify his identity. The method 700 includes obtaining the encrypted metadata from the storage server 108 upon receiving the secondary decryption key. Furthermore, the method 700 includes receiving the encrypted set of data chunks from the one or more trustee devices 110 based the obtained encrypted metadata by using the one or more transmission protocols when the predefined number of trustees accept the request to grant access upon obtaining the encrypted metadata. If the trustees do not accept the request to grant access or even one trustee approval fell short for a specific vault, the one or more electronic devices 102 may not have enough data to reconstruct any file back. In an embodiment of the present disclosure, the obtained encrypted metadata is decrypted by using the secondary decryption key, such that the encrypted set of data chunks may be received from the one or more trustee devices 110 by using the decrypted metadata. Further, the obtained encrypted set of data chunks are decrypted by using the one or more primary keys and the decrypted set of data chunks are used to create the one or more files based on the decrypted metadata by using the file scrambler 114.

In an embodiment of the present disclosure, the method 700 includes receiving an access request from the nominee to access the encrypted set of data chunks stored in the one or more trustee devices 110. In an embodiment of the present disclosure, the access request includes one or more predefined reasons of accessing the encrypted set of data chunks. For example, the one or more predefined reasons may be that the user is incapacitated, and the nominee needs funds. In an embodiment of the present disclosure, when the user assigns the nominee, the user may leave a message to the nominee that describes what do the one or more files contain and when the nominee may request access of the one or more files. The message is displayed to the nominee at the time of request. Further, the method 700 includes generating one or more notifications for requesting the one or more trustees to allow access of the encrypted metadata stored in the storage unit based on the received access request. In an embodiment of the present disclosure, the generated one or more notifications are transmitted to the one or more trustee devices 110. The one or more predefined reasons are outputted on graphical user interface screen of the one or more trustee devices 110, such that the one or more trustees may decide if the one or more predefined reasons are valid. In an embodiment of the present disclosure, the trustor may leave an instruction to the one or more trustees detailing the one or more predefined reasons under which the one or more trustees may approve the access request. The instruction is displayed to the one or more trustees after the nominee has requested access to the one or more files. For example, when the user is not available in case of an emergency, such as the user is incapacitated and the nominee requires access to the bank passwords stored in the digital vault, the nominee may raise the access request to the one or more trustees from the mobile application. Furthermore, the method 700 includes syncing or obtaining the encrypted metadata from the storage server 108 when the one or more predefined reasons are valid, and the predefined number of trustees accept the request to allow access. In an embodiment of the present disclosure, the predefined number of trustees accept the request upon verification of the reason for request of the nominee via the one or means. The method 700 includes receiving the encrypted set of data chunks from the one or more trustee devices 110 based on the obtained encrypted metadata by using the one or more transmission protocols upon obtaining the encrypted metadata. In an embodiment of the present disclosure, the obtained encrypted metadata is decrypted by using the secondary decryption key, such that the encrypted set of data chunks may be synced or received from the one or more trustee devices 110 by using the decrypted metadata. In an embodiment of the present disclosure, the nominee already has the secondary decryption key for the encrypted metadata as he or she is a trusted contact. The user may revoke access of the nominee to the one or more files at any point of time, such that the one or more files are purged and the digital vault is locked. Further, the obtained encrypted set of data chunks are decrypted by using the one or more primary keys and the decrypted set of data chunks are used to reconstruct or create the one or more files based on the decrypted metadata by using the file scrambler 114. In an embodiment of the present disclosure, the nominee or nominees may be a different list of users from the one or more trustees or there may be an overlap of one or more trustees and the nominees when the one or more of the trustees are also nominees. When the one or more trustees are also nominees, the nominee's raise request is auto approved from their role as trustee when they raise the access request. However, it is still required to meet the minimum approval requirement and wait for approval from other trustees.

The method 700 may be implemented in any suitable hardware, software, firmware, or combination thereof.

Figure 8A:
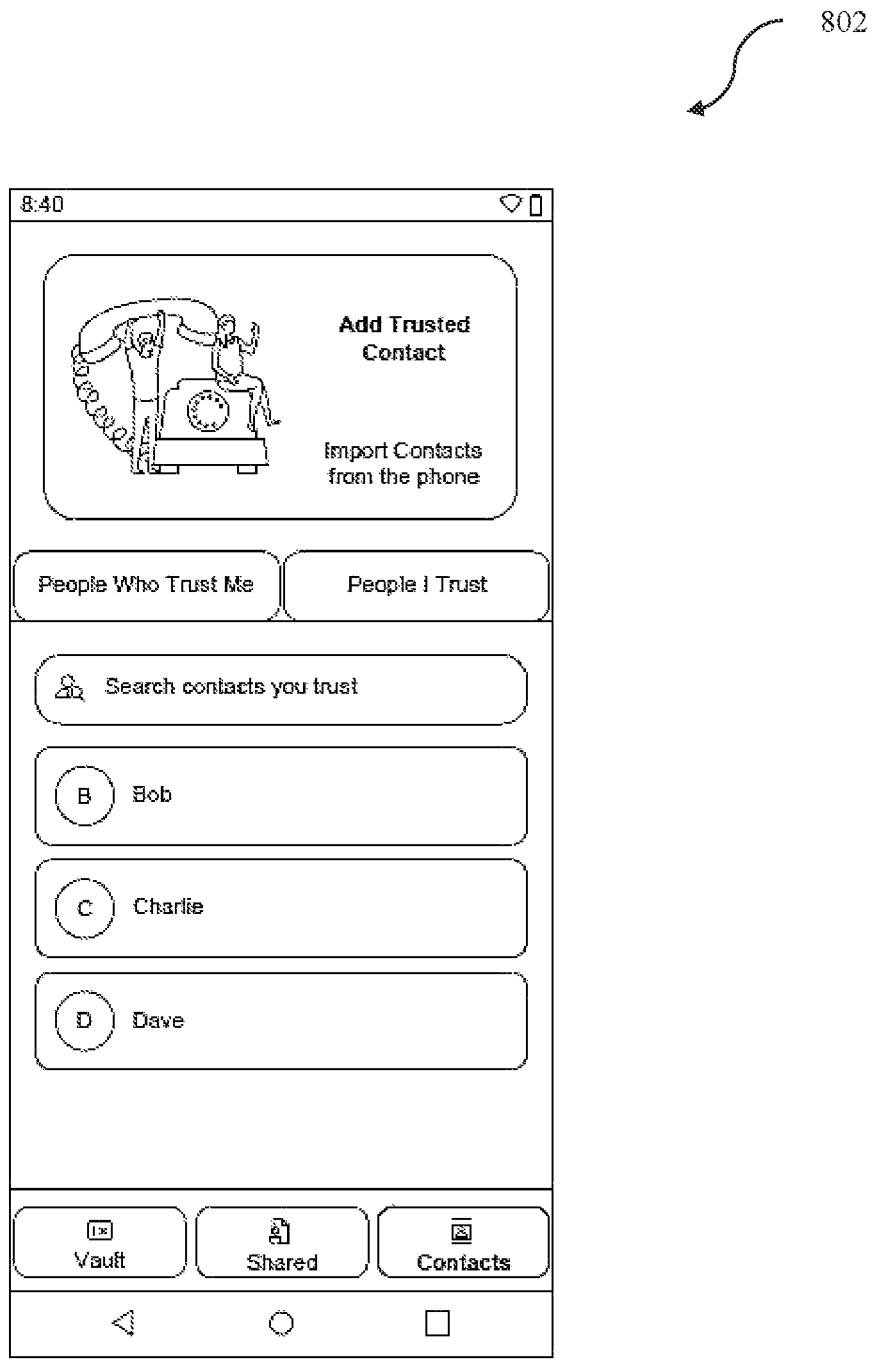
FIGS. 8A-8D are graphical user interface screens of the computing system for facilitating distributed peer to peer storage of data, in accordance with an embodiment of the present disclosure.
Figure 8B:
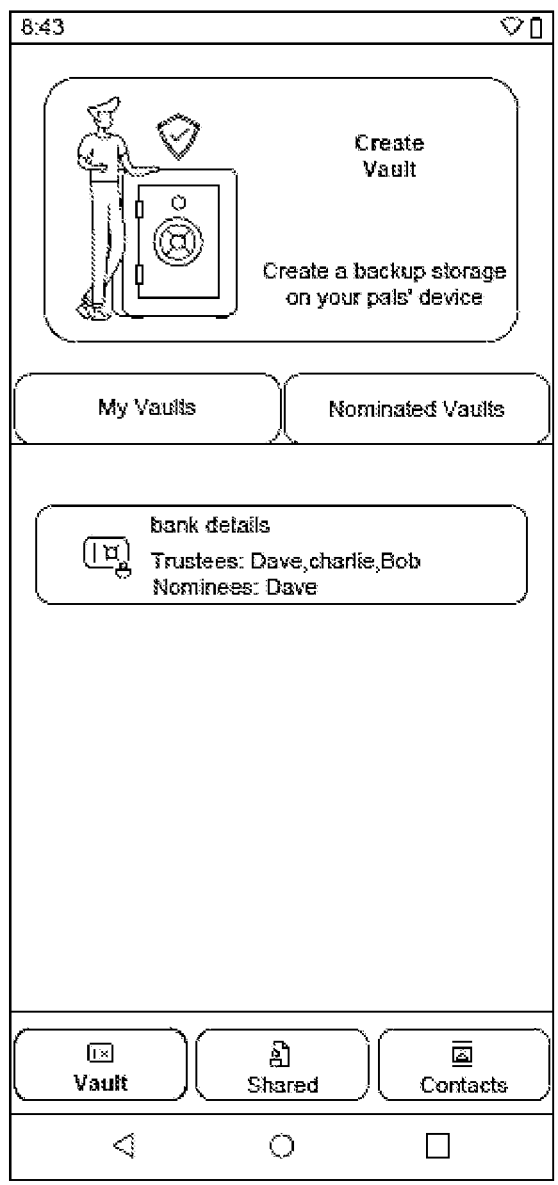
Figure 8C:
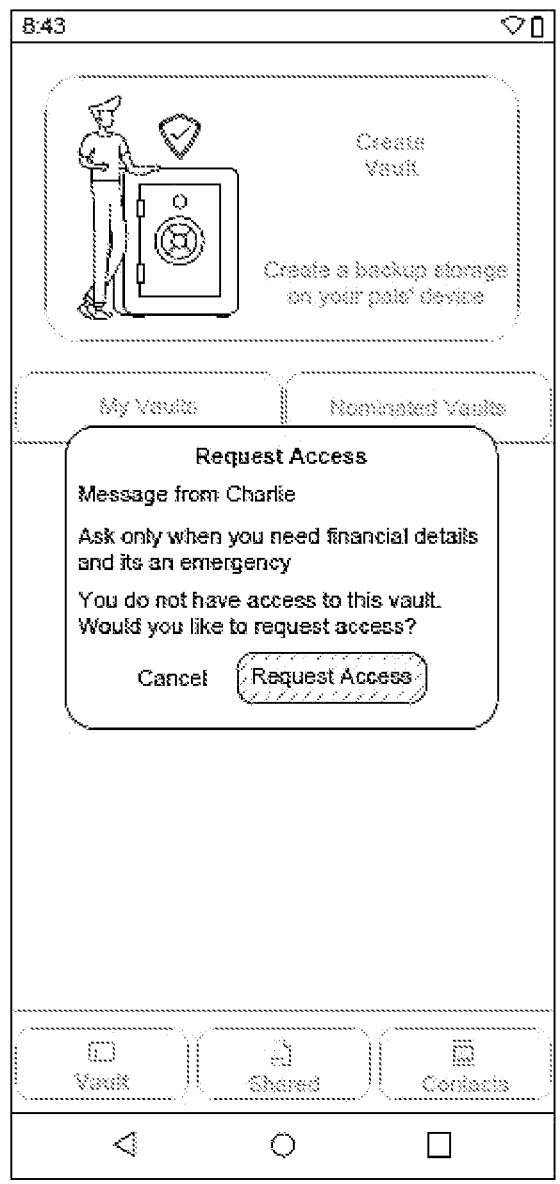
Figure 8D:
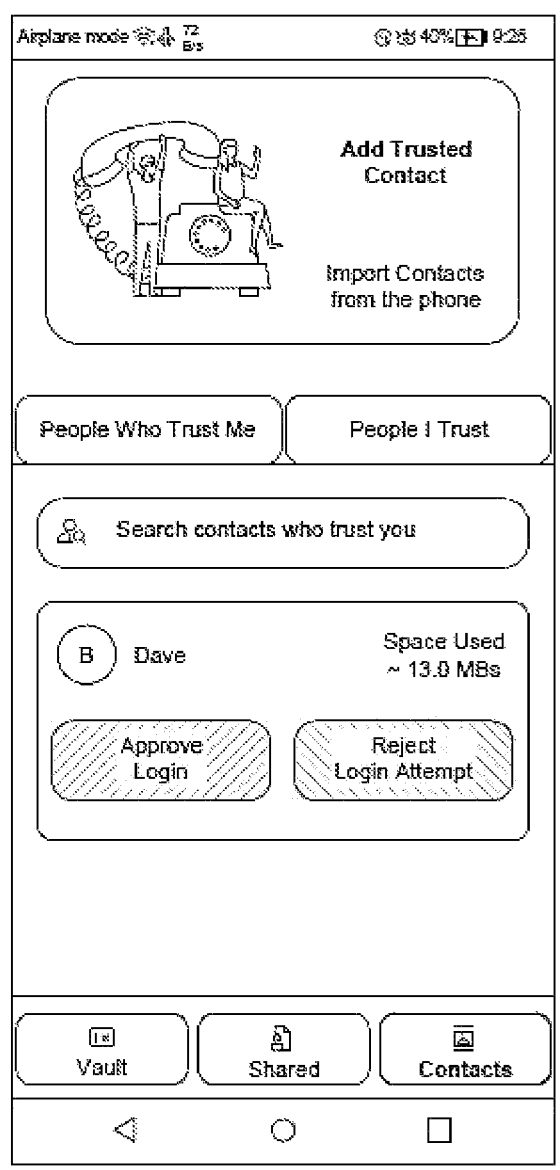

FIGS. 8A-8D are graphical user interface screens of the computing system 104 for facilitating distributed peer to peer storage of data, in accordance with an embodiment of the present disclosure. The graphical user interface screen 802 of FIG. 8A displays of a list of users who are trusted by the user i.e., the one or more trustees and a list of users who trust the user. Further, the user may search for contacts using the search bar. The graphical user interface screen 804 of FIG. 8B shows bank details of the user to be stored along with name of the one or more trustees and the nominee. Further, the graphical user interface screen 806 of FIG. 8C shows when the nominee may request access of the set of data chunks. Also, the nominee may request access by the 'request access' button on the graphical user interface screen 806. The graphical user interface screen 808 of FIG. 8D shows that a trustee may approve login request or reject login attempt of the user.

Thus, various embodiments of the present computing system 104 provide a solution to facilitate distributed peer to peer storage of data. The computing system 104 may be used for online data backup where the data is stored in a server or a cloud environment to be accessed later at the user's will. Further, the computing system 104 may be used for distributed file storage where digital files may be stored across different servers to be accessed later. The computing system 104 may provide peer to peer communication where an electronic device establishes a direct communication with another electronic device without an intermediatory server. The computing system 104 may also provide an end-to-end encryption where the communication medium assures user-privacy from eaves droppers and the server that buffers the data to be transferred. The computing system 104 creates a distributed file storage system to store backup of sensitive files across personal devices of friends, family, and colleagues of the user, rather than storing the sensitive files in cloud drives or online servers where they are susceptible to cyber-attack from malicious hackers or privacy intrusion from centralised authorities, such as the service provider or other legal agencies. The data is never stored in full in any of the personal devices and is encrypted and scrambled into smaller chunks, such that each of the personal devices stores a subset of these. Further, when the user requests the data back, the one or more trustees are required to approve the request. The user is allowed to nominate someone to access this at times of emergency upon approval of trustees. In an embodiment of the present disclosure, the number of the set of data chunks scrambled and the order of distribution of the set of data chunks are determined in such a way that it meets the one or more predefined criteria.

Further, the computing system 104 discloses a digital trust network that facilitates data backup in a distributed confidential format. Furthermore, the computing system 104 includes a human factor authorization where a trusted acquaintance authorizes a login. The computing system 104 also provides a functionality of digital nominee to establish chain of custody for the digital assets. The computing system 104 uses a trustee vote mechanism to authorize data retrieval either by the user or chain of custody by the nominee. Further, the computing system 104 uses a layered encryption mechanism that enables the user to store data and retrieve it without a provider i.e., server or host i.e., trustee having access to any data. The one or more files may only be reconstructed when any person has access to combination of the set of data chunks stored with the one or more trustees, the encrypted metadata stored in the storage server 108 and the secondary encryption key for the encrypted metadata stored with the one or more trustees. The only entity that can combine them is the user. However, the computing system 104 verified and authorized by both the storage server 108 and one or more trustees before providing access of the set of data chunks, the encrypted metadata and the secondary encryption key.

Furthermore, the computing system 104 may be used in an end consumer scenario where individuals may get benefit from it. The computing system 104 may also be used in enterprise scenarios where a research team or other strategic team whose data is very sensitive and who desires to have data backup, redundancy without compromising on privacy, confidentiality, and least exposure to data outside the premises. Further, the computing system 104 may also be used in cases where the chain of custody is required to be established for sensitive data like access credentials, research data, company strategies and the like. The computing may also be used in cases where an enterprise wants to establish fog storage model or edge storage model as opposed to a cloud storage model where data is stored with redundancy within their own premises and regular device, such as laptops, desktops and the like. The fog computing is a decentralized computing infrastructure in which data, compute, storage, and applications are located somewhere between the data source and the cloud.

In an embodiment of the present disclosure, the computing system 104 may be used in healthcare applications where patient data is stored in patients' trusted network i.e., trustees and allow access to hospital or doctors only upon the patients i.e., user or caretaker i.e., trustees approval instead of storing the patient data in the hospital infrastructure. Further, the computing system 104 may be used in enterprises that provide password manager services to store the encrypted password in the said digital trust than storing them online, cybersecurity firms may provide the digital vault as additional services, or storage providers may provide this as a value-added service where files marked sensitive go through this alternate storage mechanism. The storage providers may add the human factor authorization to their existing two factor authorizations and chain of custody to their enterprise services.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random-access memory (RAM), a read-only memory (ROM), a rigid magnetic disk and an optical disk. Current examples of optical disks include compact disk-read only memory (CD-ROM), compact disk-read/write (CD-R/W) and DVD.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

A representative hardware environment for practicing the embodiments may include a hardware configuration of an information handling; computer system in accordance with the embodiments herein. The system herein comprises at least one processor or central processing unit (CPU). The CPUs are interconnected via system bus 208 to various devices such as a random-access memory (RAM), read-only memory (ROM), and an input/output (I/O) adapter. The I/O adapter can connect to peripheral devices, such as disk units and tape drives, or other program storage devices that are readable by the system. The system can read the inventive instructions on the program storage devices and follow these instructions to execute the methodology of the embodiments herein.

The system further includes a user interface adapter that connects a keyboard, mouse, speaker, microphone, and/or other user interface devices such as a touch screen device (not shown) to the bus to gather user input. Additionally, a communication adapter connects the bus to a data processing network, and a display adapter connects the bus to a display device which may be embodied as an output device such as a monitor, printer, or transmitter, for example.

A description of an embodiment with several components in communication with each other does not imply that all such components are required. On the contrary, a variety of optional components are described to illustrate the wide variety of possible embodiments of the invention. When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article, or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open-ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

The invention claimed is:

1. A computing system for facilitating distributed peer to peer storage of data, the computing system comprising:
   one or more hardware processors; and
   a memory coupled to the one or more hardware processors, wherein the memory comprises a plurality of modules in the form of programmable instructions executable by the one or more hardware processors, and wherein the plurality of modules comprises:
      a data receiver module configured to receive a request from one or more electronic devices associated with a user to securely store one or more files, wherein the request comprises one or more trustees, number of the one or more trustees, a nominee, the one or more files, number of the one or more files and type of the one or more files, and wherein the one or more trustees correspond to a list of users who act as trusted contacts of the use;
      a file encryption module configured to encrypt the one or more files by using one or more primary encryption keys upon receiving the request, wherein each of the one or more files are encrypted by using a different primary encryption key:
      a data splitting module configured to split each of the encrypted one or more files into an encrypted set of data chunks based on the received request and one or more predefined criteria by using a file scrambler, wherein the encrypted set of data chunks are in scrambled form;
      a data transmission module configured to transmit the encrypted set of data chunks associated with each of the encrypted one or more files to one or more trustee devices associated with the one or more trustees based on the received request and the one or more predefined criteria by using one or more transmission protocols:
- a metadata encryption module configured to encrypt a metadata associated with the encrypted set of data chunks by using a secondary encryption key, wherein the secondary encryption key is synced with the one or more trustee devices via the one or more transmission protocols, and wherein the encrypted metadata is stored in the one or more electronic devices and a storage server;
- a request receiver module configured to receive a request from the one or more electronic devices to securely access the one or more files;
- a data obtaining module configured to obtain the encrypted set of data chunks and the secondary encryption key from the one or more trustee devices based on the received request and the encrypted metadata by using the one or more transmission protocols;
- a file creation module configured to create the one or more files based on the encrypted set of data chunks, the obtained secondary encryption key, and the encrypted metadata by using the file scrambler; and
- an access providing module configured to provide access of the created one or more files to the user.

2. The computing system of claim 1, wherein the metadata comprises: name of each of the one or more files, file extension, number of the encrypted set of data chunks, name of each of the encrypted set of data chunks, the one or more primary encryption keys and a mapping of one or more encrypted data chunks held by each of the one or more trustees.

3. The computing system of claim 1, wherein the computing system corresponds to a digital vault.

4. The computing system of claim 1, wherein the one or more transmission protocols comprise at least one of: a peer-to-peer communication protocol and an end-to-end encryption via the storage server, and wherein the storage server transmits data from the one or more electronic devices to the one or more trustee devices and deletes copy of the data upon successful transmission.

5. The computing system of claim 1, wherein the one or more predefined criteria comprise no trustee gets all encrypted data chunks of the one or more files and one of: no trustees less than a majority number are allowed to collectively hold the encrypted set of data chunks, a group of trustees formed by a predefined number of trustees is allowed to collectively account for the encrypted set of data chunks and the one or more trustees are allowed to collectively account for the encrypted set of data chunks, and wherein the majority number corresponds to a group of trustees formed by association of majority of the one or more trustees.

6. The computing system of claim 1, further comprises a data updating module configured to:
- update the metadata based on one or more actions performed by the user,
- wherein the one or more actions comprise creating, deleting, and editing a file; and encrypt the updated metadata by using the secondary encryption key,
- wherein the encrypted updated metadata is stored in the one or more electronic devices and the storage server.

7. The computing system of claim 1, further comprises a data retrieval module configured to:

- receive a login request from the user in case of one or more events, wherein the one or more events comprise loss of the one or more electronic devices and loss of data;
- authenticate identity of the user via one or more authentication mechanisms upon receiving the login request, wherein the one or more authentication mechanisms comprise at least one of: email id authentication, social login and phone authentication:
- generate one or more notifications for requesting the one or more trustees to grant access of a secondary decryption key based on the received login request upon successful authentication of the identity, wherein the generated one or more notifications are transmitted to the one or more trustee devices, wherein the secondary decryption key is same as the secondary encryption key as symmetric encryption is used for encrypting the metadata, and wherein the secondary decryption key is different from the secondary encryption key as asymmetric encryption is used for encrypting the metadata:
- receive the secondary decryption key from the one or more trustee devices by using the one or more transmission protocols when predefined number of trustees accept the request to grant access, wherein the predefined number of trustees accept the request upon successful verification of the identity of the user via one or means, and wherein the one or more means comprise: asking predefined questions, one or more offline verification approaches, image verification and password verification;
- obtain the encrypted metadata from the storage server upon receiving the secondary decryption key; and
- receive the encrypted set of data chunks from the one or more trustee devices based the obtained encrypted metadata by using the one or more transmission protocols when the predefined number of trustees accept the request to grant access upon obtaining the encrypted metadata.

8. The computing system of claim 1, further comprises a data access module configured to:
- receive an access request from the nominee to access the encrypted set of data chunks stored in the one or more trustee devices, wherein the access request comprise: one or more predefined reasons of accessing the encrypted set of data chunks;
- generate one or more notifications for requesting the one or more trustees to allow access of the encrypted metadata stored in the storage unit based on the received access request, wherein the generated one or more notifications are transmitted to the one or more trustee devices, and wherein the one or more predefined reasons are outputted on graphical user interface screen of the one or more trustee devices;
- obtain the encrypted metadata from the storage server when the one or more predefined reasons are valid and the predefined number of trustees accept the request to allow access, wherein the predefined number of trustees accept the request upon verification of the reason for request of the nominee via the one or more means; and
- receive the encrypted set of data chunks from the one or more trustee devices based on the obtained encrypted metadata by using the one or more transmission protocols upon obtaining the encrypted metadata.

9. The computing system of claim 1, wherein in creating the one or more files based on the encrypted set of data chunks, the obtained secondary encryption key, and the encrypted metadata by using the file scrambler, the file creation module is configured to:
- decrypt the encrypted metadata by using a secondary decryption key;
- decrypt the encrypted set of data chunks associated with each of the encrypted one or more files by using one or more primary decryption keys upon decrypting the encrypted metadata, wherein the one or more primary decryption keys are same as the one or more primary encryption keys, and wherein the encrypted set of data chunks are obtained from the one or more trustee devices upon decrypting the metadata; and
- create the one or more files based on the decrypted set of data chunks and the decrypted metadata by using the file scrambler.

10. A method for facilitating a distributed peer to peer storage of data, the method comprising:
- receiving, by one or more hardware processors, a request from one or more electronic devices associated with a user to securely store one or more files, wherein the request comprises one or more trustees, number of the one or more trustees, a nominee, the one or more files, number of the one or more files and type of the one or more files, and wherein the one or more trustees correspond to a list of users who act as trusted contacts of the use;
- encrypting, by the one or more hardware processors, the one or more files by using one or more primary encryption keys upon receiving the request, wherein each of the one or more files are encrypted by using a different primary encryption key;
- splitting, by the one or more hardware processors, each of the encrypted one or more files into an encrypted set of data chunks based on the received request and one or more predefined criteria by using a file scrambler, wherein the encrypted set of data chunks are in scrambled form;
- transmitting, by the one or more hardware processors, the encrypted set of data chunks associated with each of the encrypted one or more files to one or more trustee devices associated with the one or more trustees based on the received request and the one or more predefined criteria by using one or more transmission protocols;
- encrypting, by the one or more hardware processors, a metadata associated with the encrypted set of data chunks by using a secondary encryption key,
- wherein the secondary encryption key is synced with the one or more trustee devices via the one or more transmission protocols, and wherein the encrypted metadata is stored in the one or more electronic devices and a storage server;
- receiving, by one or more hardware processors, a request from the one or more electronic devices to securely access the one or more files;
- obtaining, by the one or more hardware processors, the encrypted set of data chunks and the secondary encryption key from the one or more trustee devices based on the received request and the encrypted metadata by using the one or more transmission protocols;
- creating, by the one or more hardware processors, the one or more files based on the encrypted set of data chunks, the obtained secondary encryption key, and the encrypted metadata by using the file scrambler; and
- providing, by the one or more hardware processors, access of the created one or more files to the user.

11. The method of claim 10, wherein the metadata comprises: name of each of the one or more files, file extension, number of the encrypted set of data chunks, name of each of the encrypted set of data chunks, the one or more primary encryption keys and a mapping of one or more encrypted data chunks held by each of the one or more trustees.

12. The method of claim 10, wherein the method corresponds to a digital vault.

13. The method of claim 10, wherein the one or more transmission protocols comprise at least one of a peer-to-peer communication protocol and an end-to-end encryption via the storage server, and wherein the storage server transmits data from the one or more electronic devices to the one or more trustee devices and deletes copy of the data upon successful transmission.

14. The method of claim 10, wherein the one or more predefined criteria comprise no trustee gets all encrypted data chunks of the one or more files and one of: no trustees less than a majority number are allowed to collectively hold the encrypted set of data chunks, a group of trustees formed by a predefined number of trustees is allowed to collectively account for the encrypted set of data chunks and the one or more trustees are allowed to collectively account for the encrypted set of data chunks, and wherein the majority number corresponds to a group of trustees formed by association of majority of the one or more trustees.

15. The method of claim 10, further comprising:
- updating the metadata based on one or more actions performed by the user, wherein the one or more actions comprise creating, deleting and editing a file; and
- encrypting the updated metadata by using the secondary encryption key,
- wherein the encrypted updated metadata is stored in the one or more electronic devices and the storage server.

16. The method of claim 10, further comprising:
- receiving a login request from the user in case of one or more events, wherein the one or more events comprise loss of the one or more electronic devices and loss of data authenticating identity of the user via one or more authentication mechanisms upon receiving the login request, wherein the one or more authentication mechanisms comprise at least one of: email id authentication, social login and phone authentication;
- generating one or more notifications for requesting the one or more trustees to grant access of a secondary decryption key based on the received login request upon successful authentication of the identity, wherein the generated one or more notifications are transmitted to the one or more trustee devices, wherein the secondary decryption key is same as the secondary encryption key as symmetric encryption is used for encrypting the metadata, and wherein the secondary decryption key is different from the secondary encryption key as asymmetric encryption is used for encrypting the metadata;
- receiving the secondary decryption key from the one or more trustee devices by using the one or more transmission protocols when predefined number of trustees accept the request to grant access, wherein the predefined number of trustees accept the request upon successful verification of the identity of the user via one or means, and wherein the one or more means comprise: asking predefined questions, one or more offline verification approaches, image verification and password verification;
- obtaining the encrypted metadata from the storage server upon receiving the secondary decryption key; and
- receiving the encrypted set of data chunks from the one or more trustee devices based the obtained encrypted metadata by using the one or more transmission protocols when the predefined number of trustees accept the request to grant access upon obtaining the encrypted metadata.

17. The method of claim 10, further comprising:
receiving an access request from the nominee to access the encrypted set of data chunks stored in the one or more trustee devices, wherein the access request comprise: one or more predefined reasons of accessing the encrypted set of data chunks:
generating one or more notifications for requesting the one or more trustees to allow access of the encrypted metadata stored in the storage unit based on the received access request, wherein the generated one or more notifications are transmitted to the one or more trustee devices, and wherein the one or more predefined reasons are outputted on graphical user interface screen of the one or more trustee devices;
obtaining the encrypted metadata from the storage server when the one or more predefined reasons are valid and the predefined number of trustees accept the request to allow access, wherein the predefined number of trustees accept the request upon verification of the reason for request of the nominee via the one or more means; and
receiving the encrypted set of data chunks from the one or more trustee devices based on the obtained encrypted metadata by using the one or more transmission protocols upon obtaining the encrypted metadata.

18. The method of claim 10, wherein creating the one or more files based on the encrypted set of data chunks, the obtained secondary encryption key, and the encrypted metadata comprises:
decrypting the encrypted metadata by using a secondary decryption key;
decrypting the encrypted set of data chunks associated with each of the encrypted one or more files by using one or more primary decryption keys upon decrypting the encrypted metadata, wherein the one or more primary decryption keys are same as the one or more primary encryption keys, and wherein the encrypted set of data chunks are obtained from the one or more trustee devices upon decrypting the metadata; and
creating the one or more files based on the decrypted set of data chunks and the decrypted metadata by using the file scrambler.

19. A non-transitory computer-readable storage medium having instructions stored therein that, when executed by a hardware processor, cause the processor to perform method steps comprising:

receiving a request from one or more electronic devices associated with a user to securely store one or more files, wherein the request comprises one or more trustees, number of the one or more trustees, a nominee, the one or more files, number of the one or more files and type of the one or more files, and wherein the one or more trustees correspond to a list of users who act as trusted contacts of the use;
encrypting the one or more files by using one or more primary encryption keys upon receiving the request, wherein each of the one or more files are encrypted by using a different primary encryption key;
splitting each of the encrypted one or more files into an encrypted set of data chunks based on the received request and one or more predefined criteria by using a file scrambler, wherein the encrypted set of data chunks are in scrambled form;
transmitting the encrypted set of data chunks associated with each of the encrypted one or more files to one or more trustee devices associated with the one or more trustees based on the received request and the one or more predefined criteria by using one or more transmission protocols;
encrypting a metadata associated with the encrypted set of data chunks by using a secondary encryption key, wherein the secondary encryption key is synced with the one or more trustee devices via the one or more transmission protocols, and wherein the encrypted metadata is stored in the one or more electronic devices and a storage server;
receiving a request from the one or more electronic devices to securely access the one or more files;
obtaining the encrypted set of data chunks and the secondary encryption key from the one or more trustee devices based on the received request and the encrypted metadata by using the one or more transmission protocols;
creating the one or more files based on the encrypted set of data chunks, the obtained secondary encryption key, and the encrypted metadata by using the file scrambler; and
providing access of the created one or more files to the user.

20. The non-transitory computer-readable storage medium of claim 19, wherein the metadata comprises: name of each of the one or more files, file extension, number of the encrypted set of data chunks, name of each of the encrypted set of data chunks, the one or more primary encryption keys and a mapping of one or more encrypted data chunks held by each of the one or more trustees.

* * * * *